United States Patent [19]

Hiramatsu et al.

[11] Patent Number: 5,031,191
[45] Date of Patent: Jul. 9, 1991

[54] SPREAD SPECTRUM SIGNAL DEMODULATION CIRCUIT

[75] Inventors: Tatsuo Hiramatsu, Higashiosaka; Hiroaki Takagi, Hirakata, both of Japan

[73] Assignee: Sanyo Electric Co., Ltd., Osaka, Japan

[21] Appl. No.: 524,102

[22] Filed: May 16, 1990

[30] Foreign Application Priority Data

May 17, 1989 [JP] Japan .................................. 1-123913
Jun. 15, 1989 [JP] Japan .................................. 1-153280
Aug. 4, 1989 [JP] Japan .................................. 1-203071
Dec. 20, 1989 [JP] Japan .................................. 1-330282

[51] Int. Cl.$^5$ ............................................. H04K 1/00
[52] U.S. Cl. ........................................ 375/1; 380/46; 375/115
[58] Field of Search .................... 375/1, 92, 111, 115; 380/46; 455/208, 209, 255, 257, 259, 265, 317

[56] References Cited

U.S. PATENT DOCUMENTS 4,903,279 2/1990 Murikami et al. ................... 375/1
4,924,188 5/1990 Akazawa et al. ................... 375/1
4,943,975 7/1990 Kurihara et al. ................... 375/1

Primary Examiner—Thomas H. Tarcza
Assistant Examiner—Tod Swann
Attorney, Agent, or Firm—Armstrong, Nikaido, Marmelstein, Kubovcik & Murray

[57] ABSTRACT

A spread spectrum signal demodulation circuit includes a multiplier which multiplies an input spread spectrum signal by a demodulation PN code, and a demodulation PN code generator generates the demodulation PN code by utilizing an oscillation signal from a VCO as a clock signal thereof. An output of the multiplier is given to a bandpass filter and an output of which is integrated by an integration circuit. A first integrated value for a first time is compared with a second integrated value for a second time later than the first time and, in accordance with a comparison result, a frequency of the oscillation signal of the VCO is changed so that the demodulation PN code is synchronized with a modulation PN code included in the input spread spectrum signal.

7 Claims, 16 Drawing Sheets

FIG. 3
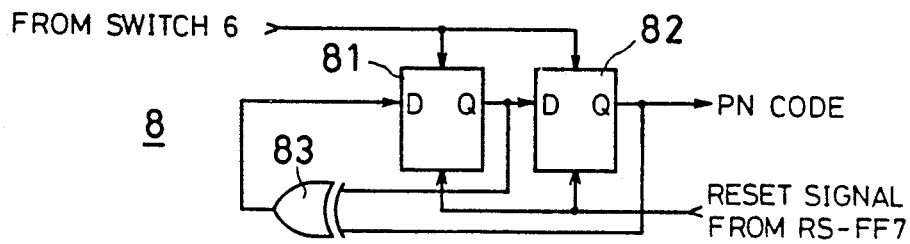
FIG. 4(A) INPUT FROM 6
FIG. 4(B) PN CODE
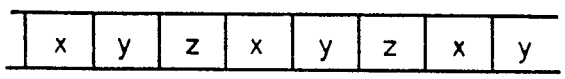
FIG. 6
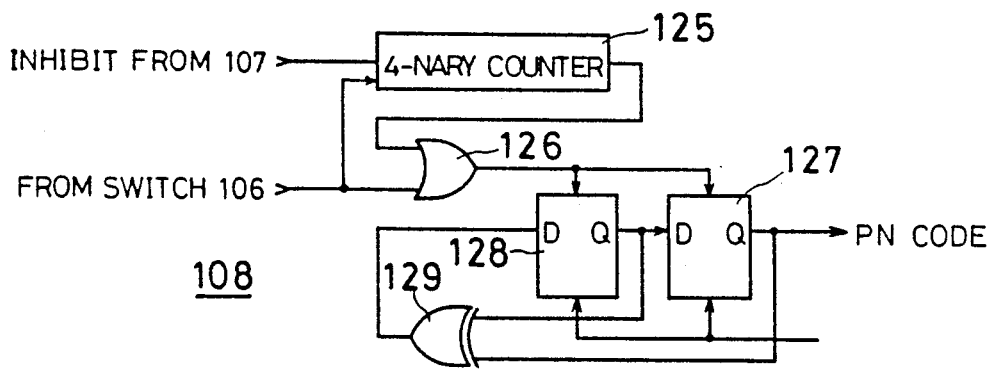
FIG. 7(A) INPUT FROM 106
FIG. 7(B) OUTPUT OF 125
FIG. 7(C) OUTPUT OF 126
FIG. 7(D) PN CODE
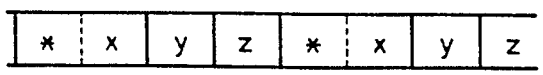

FIG. 10(A)
CLOCK SIGNAL FROM 120
FIG. 10(B)
OUTPUT OF 130
FIG. 10(C)
RESET SIGNAL FROM 120
FIG. 10(D)
OUTPUT OF 132
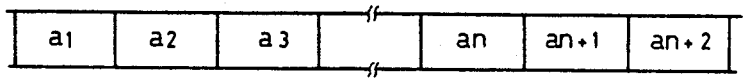
FIG. 10(E)
OUTPUT OF 119
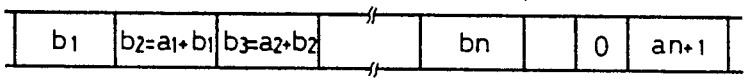
FIG. 10(F)
OUTPUT OF 121
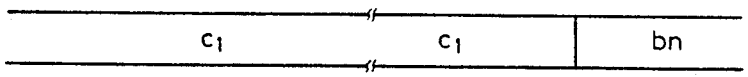
FIG. 12(A)
RESET SIGNAL FROM 120
FIG. 12(B)
OUTPUT OF 142
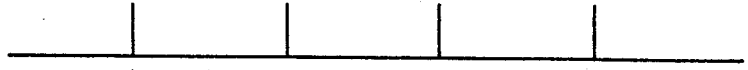
FIG. 12(C)
OUTPUT OF 143
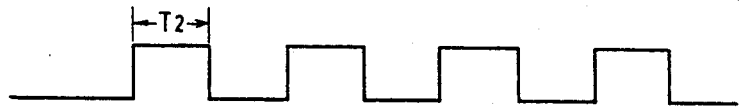

F I G. 15
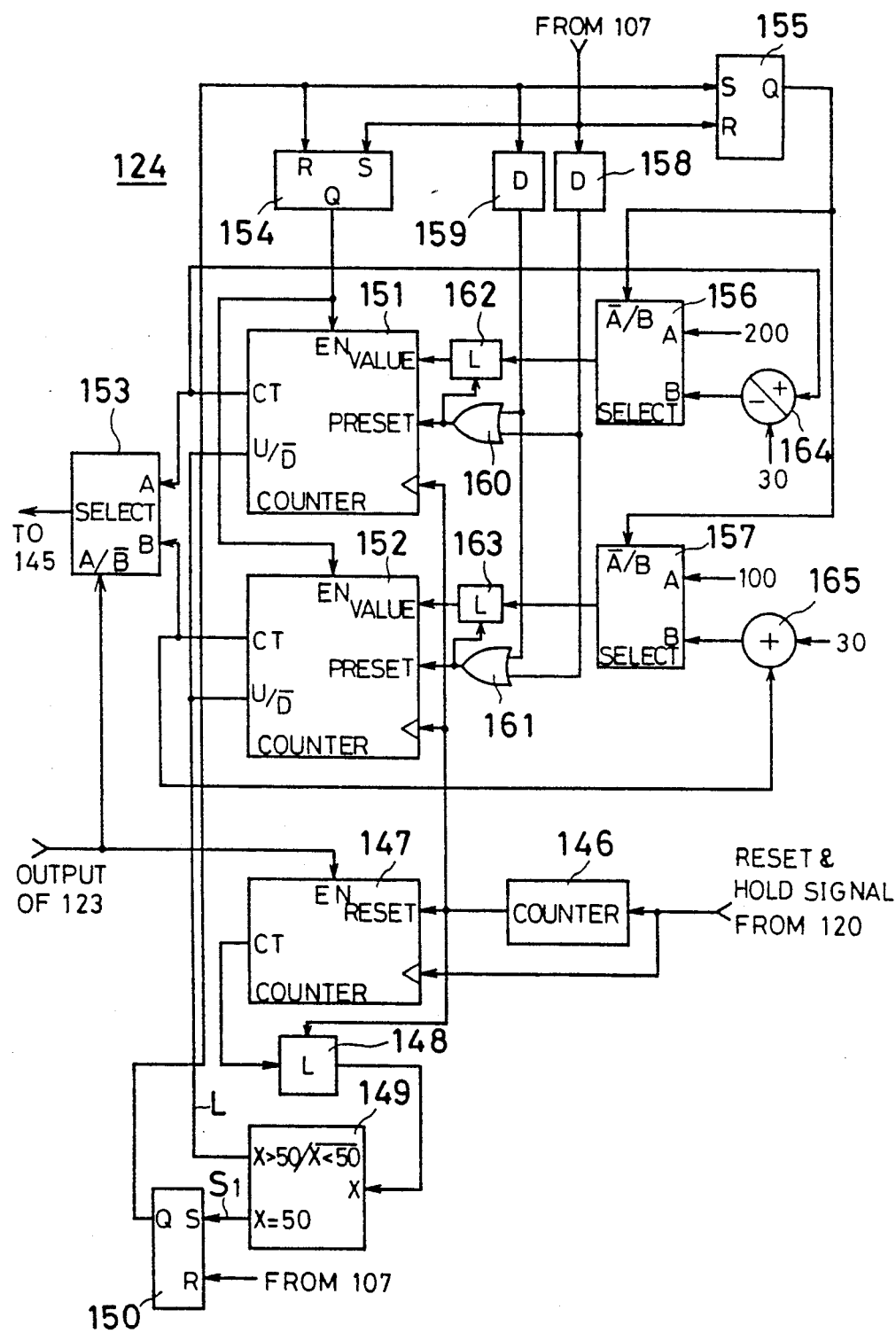

FIG. 21
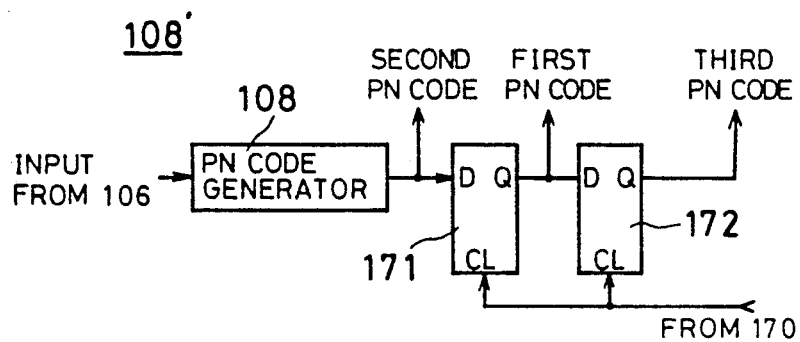
FIG. 22(A)
OUTPUT OF 102
FIG. 22(B)
OUTPUT OF 170
FIG. 22(C)
FIRST PN CODE
FIG. 22(D)
SECOND PN CODE
FIG. 22(E)
THIRD PN CODE
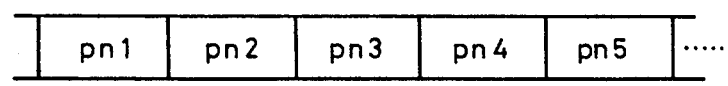

FIG. 23
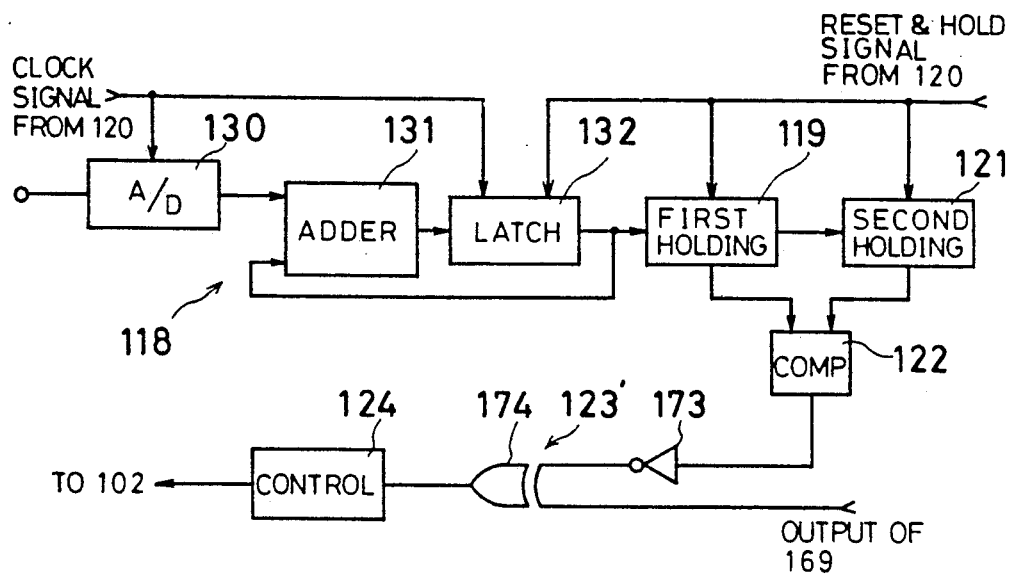
FIG. 24(A)
RESET & HOLD SIGNAL FROM 120
FIG. 24(B)
OUTPUT OF 169
FIG. 24(C)
OUTPUT OF 168
| THIRD PN CODE | SECOND PN CODE | THIRD PN CODE | SECOND PN CODE | THIRD PN CODE |
FIG. 24(D)
OUTPUT OF 118
FIG. 24(E)
OUTPUT OF 119
| Iv21 | Iv31 | Iv22 | Iv32 | Iv23 |
FIG. 24(F)
OUTPUT OF 121
| Iv0 | Iv21 | Iv31 | Iv22 | Iv32 |

F I G. 25
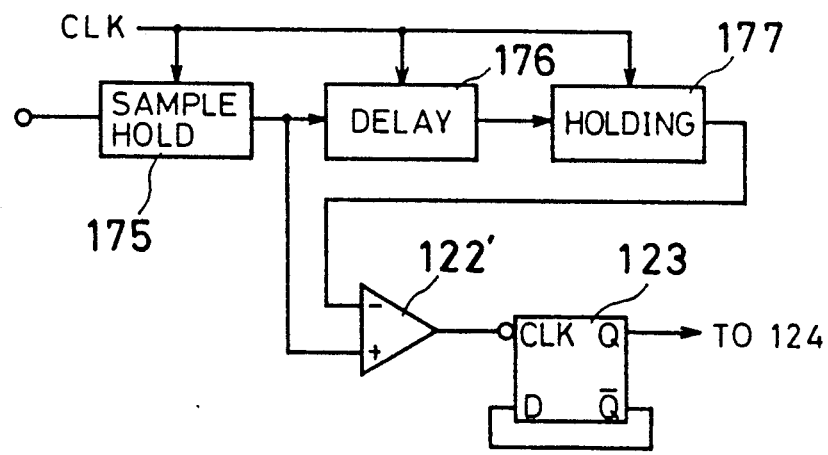

SPREAD SPECTRUM SIGNAL DEMODULATION CIRCUIT

BACKGROUND OF THE INVENTION

1. Field of the Invention

The present invention relates to a spread spectrum signal demodulation circuit. More specifically, the present invention relates to a spread spectrum signal demodulation circuit in which a demodulation PN code for demodulating a spread spectrum signal is generated by utilizing a variable frequency oscillator such as a voltage-controlled oscillator.

2. Description of the Prior Art

Conventionally, a spread spectrum communication system is known, wherein a carrier signal a spectrum of which is spread by a binary pseudo noise code (hereinafter, simply called as "PN code") having a spectrum width sufficiently broader than an information signal is transmitted, and at a receiving side, an original information signal is restored by multiplying a received signal by a demodulation PN code which is the same as a modulation PN code being used at a transmitting side.

In such a spread spectrum communication system, since the spectrum of the information signal is spread by a PN code having a broader spectrum width, in order to correctly restore the information signal, it is necessary to synchronize the demodulation PN code which is generated at the receiving side with the modulation PN code which is generated at the transmitting side.

As a method for synchronizing both the PN codes, a tau-dither method as shown in FIG. 1 is well known. In FIG. 1, a received spread spectrum signal is input to a first multiplier 9 through an input terminal 1. In addition, an output of a VCO (voltage-controlled oscillator) 2 is phase-modulated by an output signal from a low-frequency oscillator 4 such as a multivibrator in a phase modulator 3. An output from the phase modulator 3 is given to a selector 6 to which an oscillation signal from an oscillator 5 is further given. Any one of the above described signals is selectively output from the selector 6 in response to a high level or a low level of an output of an RS flip-flop 7 to be given to a PN code generator 8 and used as a clock signal therein. A modulation PN code from the PN code generator 8 is multiplied by the received spread spectrum signal in the multiplier 9. An output from the multiplier 9 is output at an output terminal 17 through a bandpass filter 10.

With reference FIG. 3, a description will be made for the PN code generator 8. The PN code generator 8 includes two D flip-flops 81 and 82 constituting a 2-bit shift register and, as a clock for the shift register constructed by the D flip-flops 81 and 82, a signal from the selector 6 (the oscillation signal from the oscillator 5 or VCO 2) is applied thereto. Outputs of the D flip-flops 81 and 82 of the shift register are given to an exclusive OR gate 83 and an output of the exclusive OR gate 83 is input to the most significant bit of the shift register, that is, a data input of the D flip-flop 81. Then, a demodulation PN code is output from the least significant bit of the shift register, that is, an output Q of the D flip-flop 82.

If the contents of the shift register, that is, the D flip-flop 81 and 82 are initially "11", the output of the exclusive OR gate 83 becomes "0", and therefore, the contents of the D flip-flop 81 and 82 become "01" in response to a next clock from the selector 6. At this time, the exclusive OR gate 83 receives "0" and "1" and thus outputs "1". Therefore, when a next shift clock is given thereto, the contents of the D flip-flops 81 and 82 become "10". Therefore, the output of the exclusive OR gate 83 becomes "1" again and, when a next shift clock is given thereto, the contents of the D flip-flops 81 and 82 become "11". Thus, as shown in FIG. 4, in response to each of the shift clocks from the selector 6, a modulation PN code x, y and z such as "1", "1" and "0" are cyclically output. Therefore, the modulation PN code is formed by repetition of the data of 3 bits, for example.

Returning to FIG. 1, an output of the bandpass filter 10 is envelope-detected in a detector 11. An output of the envelope-detector 11 is further given to a multiplier 13 through a bandpass filter 12. Then, in the multiplier 13, an output signal from the bandpass filter 12 is multiplied by the output signal from the low-frequency oscillator 4. An output signal of the multiplier 13 is given to the VCO 2 through a low-pass filter 14 as a control signal therefor.

In addition, the output of the above described bandpass filter 10 is also applied to a level detector from which a set input S is given to an RS flip-flop 7 when the output level is more than a predetermined value. A signal from a switch 16 is given to a reset input of the RS flip-flop 7.

In the spread spectrum communication system, it is known that a level of the output signal from the multiplier 9 is changed as shown in FIG. 2 in accordance with a relative change of phases of the modulation PN code included the input spread spectrum signal and the demodulation PN code from the PN code generator 8.

In the spread spectrum signal demodulation circuit as shown in FIG. 5, when the switch 16 is operated to demodulate a spread spectrum signal, the RS flip-flop 7 is reset and the output Q becomes the low level. Therefore, the signal from the oscillator 5 is selectively applied to the PN code generator 8 through the selector 6 so that the oscillation signal from the oscillator 5 is used in the PN code generator 8 as a clock signal. Therefore, a modulation PN code is generated from the PN code generator 8 by using the oscillation signal of the oscillator. The demodulation PN code from the PN code generator 8 is multiplied with the spread spectrum signal from the input terminal 1 in the multiplier 9. If the phase of the demodulation PN code is not coincident with the phase of the modulation PN code included in the spread spectrum signal, it is impossible to demodulate the spread spectrum signal, and therefore, no output is obtained from the bandpass filter 10.

If, if the phase of the demodulation PN code from the PN code generator 8 is changed and the output of the multiplier 9, that is, bandpass filter 10 becomes larger than the predetermined level, the high level signal is output from the level detector 15. Therefore, the RS flip-flop is set so that the output Q the RS flip-flop becomes the high level. Therefore, the selector 6 selects the output of the phase modulator 3 to apply the PN code generator 8. In this state, assuming that an initial phase of the demodulation PN code from the PN code generator 8 exists a position of a point aa of FIG. 2 and the phase is advanced and shifted to a point ab, a relative phase of both the PN codes is between both the points aa and ab in accordance with a rectangular signal from the low-frequency oscillator 4, and in response thereto, the output signal of the first multiplier 9 is subjected to an amplitude modulation at the same frequency as that of the rectangular signal.

This amplitude-modulated components are derived by the bandpass filter 12 and thereafter multiplied by the rectangular signal in the multiplier 13 so that a direct current signal having a correct polarity and a correct level is obtainable to be given to the VCO 2 as a control signal therefor. A frequency of the VCO 2 is changed by the control signal, thereby to change the phase of the demodulation PN code from PN code generator 8.

In addition, where the relative phase of the both PN codes is between points ba and bb, a polarity of the output of the first multiplier 9 is reversed and a phase change of the demodulation PN code from the PN code generator 8 is also reversed.

Furthermore, where the relative phase of the both the PN codes is between points ca and cb sandwiching a peak of a correlation output as shown in FIG. 2, no change occurs in an amplitude of the output signal from the multiplier 9. Therefore, no amplitude-modulated components to be supplied to the multiplier 13 exist, and thus, the oscillation frequency of the VCO 2 that is, the phase of the demodulation PN code from the PN code generator 8 is not changed.

In such a tau-dither method, in order to synchronize the phase of the demodulation PN code at the receiving side with that of the modulation PN code at the transmitting side, it is necessary to use the phase modulator 3 as shown in FIG. 1. Therefore, a circuit configuration of a spread spectrum signal demodulation circuit was complex.

SUMMARY OF THE INVENTION

Therefore, a principal object of the present invention is to provide a novel spread spectrum signal demodulation circuit.

Another object of the present invention is to provide a spread spectrum signal demodulation circuit in which a circuit configuration can be made simple.

The other object of the present invention is to provide a spread spectrum demodulation circuit using no phase modulator.

A spread spectrum signal demodulation circuit in accordance with the present invention comprises: a variable frequency oscillator a frequency of which is changed in accordance with a control signal as applied; PN code generating device for generating a demodulation PN code by using an oscillation signal of the variable frequency oscillator as a clock therefor; multiplying device for multiplying an input spread spectrum signal by the demodulation PN code; filter device for receiving an output of the multiplying device; first holding devices for holding a first value associated with an output of the filter device at a first time; second holding device for holding a second value associated with an output of the filter device at a second time earlier than the first time; comparing device for comparing the first value and the second value being respectively held by the first holding device and the second holding device with each other; and controlling device for outputting the control signal for controlling the variable frequency oscillator in accordance with an output of the comparing device to synchronize the demodulation PN code from the PN code generating device with a modulation PN code included in the input spread spectrum signal.

In one embodiment, the first holding device and the second holding device sample-hold an output of the filter means at the first and the second times, respectively, to obtain the first value and the second value. In another embodiment, the output of the filter means is integrated for the first time period and the second time period, respectively, to obtain the first value and the second value. The first value and the second value are compared with each other in the comparing device and, when the second value is smaller than the first value, a high level signal is output from the comparing device, and a low level signal is output when the second value is larger than the first value. When the output of the comparing device is the high level, it is determined in the control device that a phase of the demodulation PN code from the PN code generating device is changed in a direction that the same is synchronized with a phase of the modulation PN code included in the spread spectrum signal and, when the output of the comparing device is the low level, it is determined that the phase of the demodulation PN code is changed in a direction that the same is not synchronized with the phase of the modulation PN code. The control signal is output from the control device to change an oscillation frequency of the variable frequency oscillator so that the respective phases of the demodulation PN code and the modulation PN code are synchronized with each other. Therefore, in accordance with the present invention, it is possible to omit a phase modulator which is utilized in a conventional tau-dither method, and therefore, a circuit configuration of the spread spectrum signal demodulation circuit can be made simple.

In addition, the oscillation frequency of the variable frequency oscillator is changed to a higher frequency or a lower frequency in a binary manner. If a frequency difference between the higher frequency and a frequency of the modulation PN code is different from a frequency difference between the lower frequency and the frequency of the modulation PN code, since a level difference between a correlation output at the higher frequency and the correlation output at the lower frequency becomes large, a signal become to be easily affected by noise. Therefore, the difference between the former frequency difference and the latter frequency difference is made as small as possible, and therefore, the noise-resistant can be increased.

In addition, in the other embodiment, since a signal path for demodulating the data and a signal path for synchronization of the PN code are independently formed, a changing amount of the synchronization PN code enough to demodulate the spread spectrum signal can be ensured.

The objects and other objects, features, aspects and advantages of the present invention will become more apparent from the following detailed description of the embodiments of the present invention when taken in conjunction with accompanying drawings.

BRIEF DESCRIPTION OF THE DRAWINGS

FIG. 3 is a block diagram showing a PN code generator which can be utilized in a prior art shown in FIG. 1.

FIGS. 4(A & B) is a timing chart showing an operation of a PN code generator shown in FIG. 3.

FIG. 6 is a block diagram showing a PN code generator which can be utilized in FIG. 5 embodiment.

FIGS. 7(A-D) is a timing chart showing an operation of a PN code generator shown in FIG. 6.

FIGS. 10(A-F) is a timing chart showing an operation of FIG. 5 embodiment.

FIGS. 12(A-C) is a wave-form chart showing an operation of FIG. 11 embodiment.

FIG. 15 is a block diagram showing a control circuit utilized in FIG. 14 embodiment.

FIG. 21 is a block diagram showing one example of a PN code generating circuit in FIG. 20 embodiment.

FIGS. 22(A-E) is a timing chart showing an operation of a PN code generating circuit shown in FIG. 21.

FIG. 23 is a block diagram of a major portion showing FIG. 20 embodiment in more detail.

FIGS. 24(A-F) is a timing chart showing an operation of FIG. 23 embodiment.

FIG. 25 is a block diagram of a major portion showing a modified example of a comparing circuit and portions associated therewith.

DETAIL DESCRIPTION OF THE PREFERRED EMBODIMENTS

Figure 5:
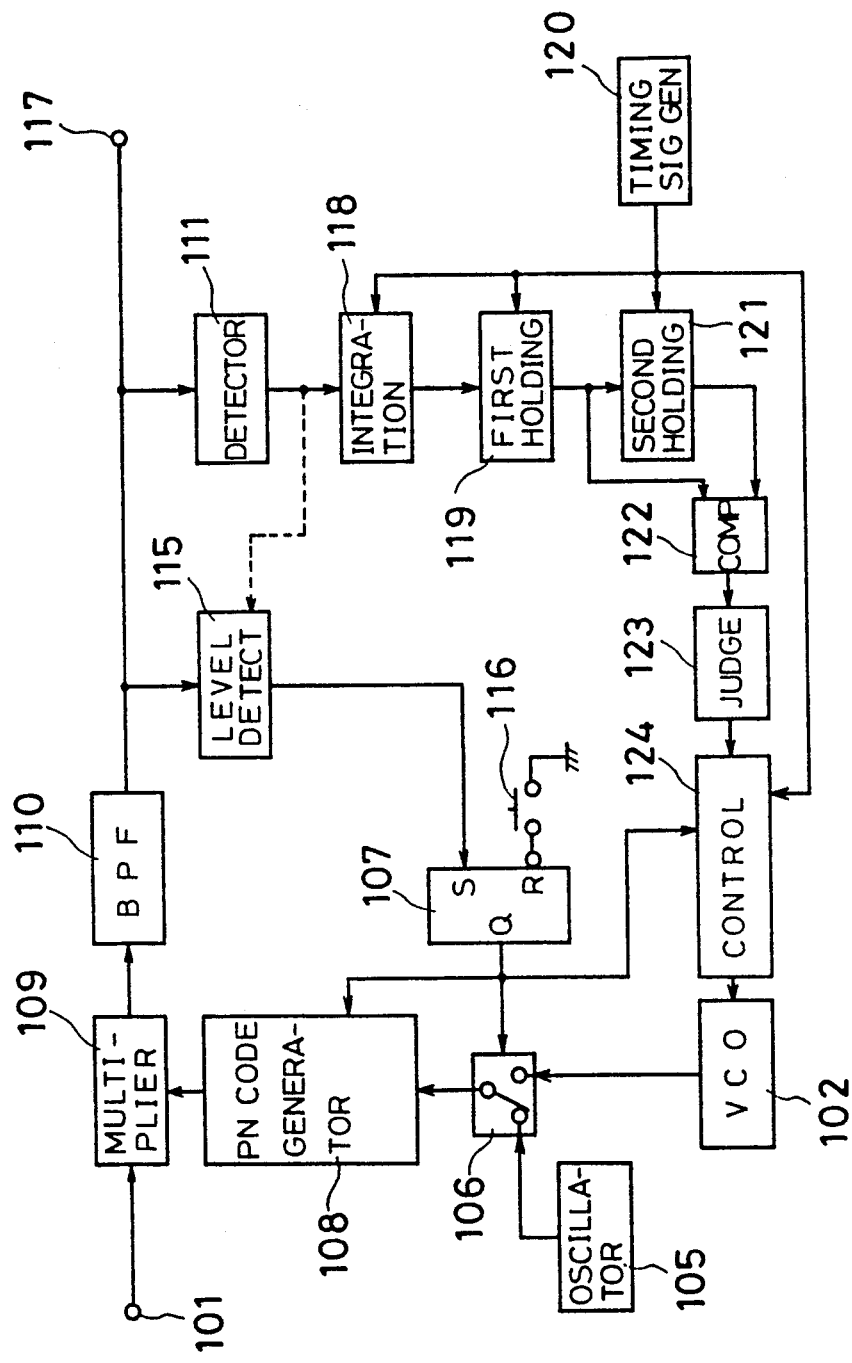
FIG. 5 is a block diagram showing one embodiment in accordance with the present invention.

With reference to FIG. 5 which shows one embodiment in accordance with the present invention, a received spread spectrum signal is input to a multiplier 109 through an input terminal 101. An output of a VCO (voltage-controlled oscillator) 102 is given to a selector 106 to which an oscillation signal from an oscillator 105 is further applied. In response to a high level or a low level of an output Q of an RS flip-flop 107, any one of the above described two inputs is selectively output from the selector 106 to be applied to a PN code generator 108, being used as a clock signal. A demodulation PN code from the PN code generator 108 is multiplied by the spread spectrum signal in the multiplier 109. An output of the multiplier 109 is output at an output terminal 117 through a bandpass filter 110.

With reference to FIG. 6, a description will be made for the PN code generator 108. The PN code generator 108 includes D flip-flops 127 and 128 constituting a 2-bit shift register. A signal from the selector 106 (the oscillation signal of the oscillator 105 or the VCO 102) is given to the shift register constructed by the D flip-flop 127 and 128 as a shift clock therefor through one input of an OR gate 126. To the other input of the OR gate 126, an output of a 4-nary counter 125 is given, which receives a clock from the selector 106 as a count input thereof. Then, outputs of respective D flip-flops 127 and 128 are applied to respective inputs of an exclusive OR gate 129 an output of which is given to the most significant bit of the shift register, that is, a data input of the D flip-flop 28. A demodulation PN code is output from the least significant bit of the shift register, that is, an output Q of the D flip-flop 127.

A clock as shown in FIG. 7(A) is output from the selector 106 and the clock is counted by the 4-nary counter 125. Therefore, an output which becomes the high level at every 4 clocks is output from the 4-nary counter 125, as shown in FIG. 7(B). Since the output of the 4-nary counter 125 and the clock from the selector 106 are applied to the OR gate 126, an output of the OR gate 126 becomes as shown in FIG. 7(C).

If the contents of D flip-flops 127 and 128 constituting the shift register are initially "11", the output of the exclusive OR gate 129 becomes "0", and the output thereof is given to the most significant bit of the shift register, that is, the data input of the D flip-flop 128. Therefore, when a next shift clock is applied thereto through the OR gate 126, the contents of the D flip-flops 127 and 128 become "01". At a timing of a next shift clock, the contents of the D flip-flops 127 and 128 become "10". Therefore, as similar to the PN code generator 8 as shown in FIG. 3, a demodulation PN code x, y and z such as "1", "1" and "0" are output from the shift register, that is, the D flip-flop 127. However, as seen from FIG. 7(C) and FIG. 7(D), a width of the PN code x is expanded to double each of the other PN codes y and z due to the output of the 4-nary counter 125. Therefore, a front half of the PN code x becomes a blank or indefinite bit "*" (a dummy bit). Therefore, as shown FIG. 7(D), *, x, y and z are cyclically output from the PN code generator 108 shown in FIG. 6. Therefore, the demodulation PN code is formed by the repetition of the data of 4 bits. Thus, by making the number of bits of the modulation PN code different from the number of bits of the demodulation PN code, a phase of the second PN code can be gradually changed with respect to a phase of the modulation PN code.

More specifically, although not shown, as the modulation PN code included in the input spread spectrum signal, the PN code previously described with reference to FIG. 3 and FIG. 4 can be utilized. By making the number of bits of the demodulation PN code different from the number of bits of the modulation PN code, the phase of the demodulation PN code can be gradually changed with respect to the phase of the modulation PN code. More specifically, the demodulation PN code from the PN code generator 108 is formed by 3 bits of x, y and z plus one indefinite bit, the same becomes equal to the modulation PN code x, y and z which is phase-shifted gradually one by one bit. Therefore, a correlation between the modulation PN code included in the received spread spectrum signal and the demodulation PN code output from the PN code generator 108 is established at every 12 bits. For example, a signal width (chip) of each of the demodulation PN code and the modulation PN code is 1 microsecond, the correlation between the modulation PN code and the demodulation PN code can be established at every 12 microseconds.

Returning to FIG. 5, the signal from the bandpass filter 110 is also envelope-detected by a detector 111. An output of the envelope-detector 111 is input to an integration circuit 118. An output of the integration circuit 118 is held by a first holding circuit 119. An output of the first holding circuit 119 is given to a second holding circuit 121 and to a comparing circuit 122 as one input thereof. To the other input of the comparing circuit 122, an output of the second holding circuit 121 is applied. In addition, predetermined timing signals from a timing signal generator 120 (described later) are applied to these integration circuit 118, and the first and second holding circuits 119 and 121.

An output level of the first holding circuit 119 and an output level of the second holding circuit 121 are compared with each other in the comparing circuit 122, and a signal of the high level is output from the comparing circuit 122 when the output of the first holding circuit 119 is larger than the output of the second holding circuit 121. The output of the high level or the low level from the comparing circuit 122 is given to a judge circuit 123. In the judge circuit 123, in response to the high level or the low level of the output of the comparing circuit 122, it is determined that the phase of the demodulation PN code from the PN code generator 108 is in a synchronous state with the phase of the modulation PN code included in the input spread spectrum signal or in an asynchronous state therewith.

A signal from the judge circuit 123 is input to a control circuit 124. The control circuit 124 receives the signal from the judge circuit 123 and the output Q of the RS flip-flop 107, and outputs a control signal for making the frequency of the VCO 102 be higher or lower in accordance with states of these signals.

In addition, the output of the aforementioned bandpass filter 110 is further applied to a level detector 115, and a set input S is applied to the RS flip-flop 107 when the output level of the bandpass filter 110 is larger than a predetermined level. A signal from a switch 116 is given to a reset input R of the RS flip-flop 107.

Since the level detector 115 also includes an enveloped-detector, if the output of the enveloped-detector 111 is also given to the level detector 115 as shown by a dotted line in FIG. 5, it is possible to omit a necessary enveloped-detector in the level detector 115. Furthermore, an A/D converter 130 (FIG. 8) has a non-linear characteristic so that an output thereof becomes zero when an input signal level is smaller than a predetermined level, and therefore, the input is half-rectified in the A/D converter 130. In addition, it is possible to digitally detect the level of the signal after an A/D conversion, and therefore, the envelope-detector 111 may also be omitted.

Figure 8:
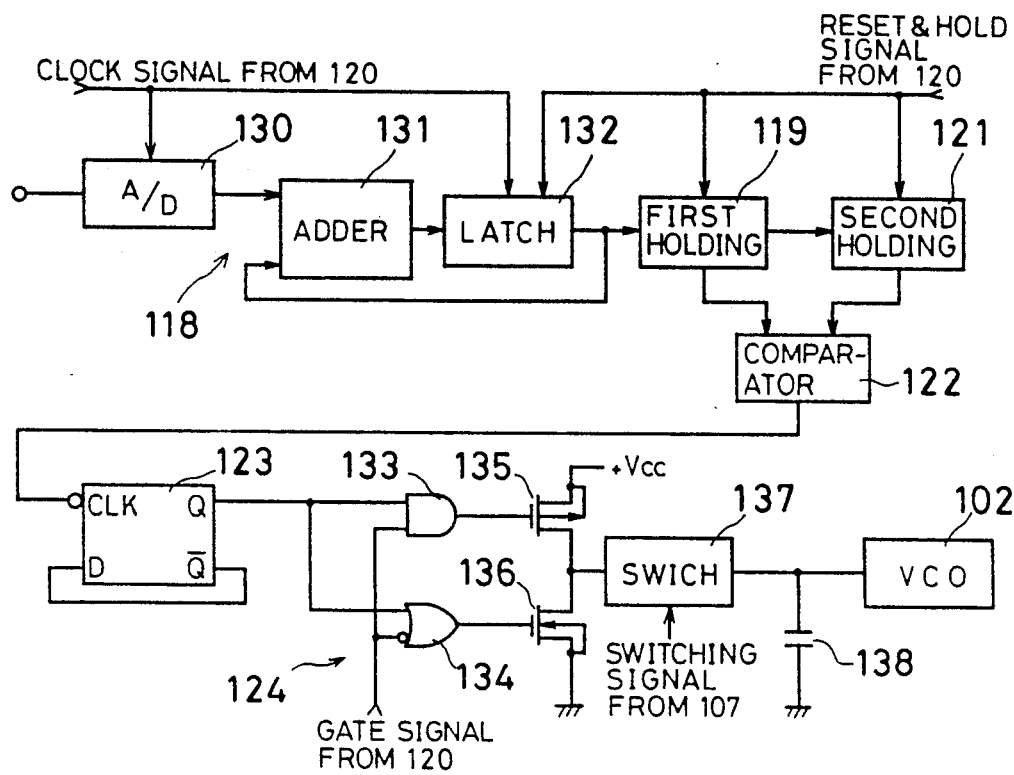
FIG. 8 is a block diagram of a major portion showing FIG. 5 embodiment in more detail.

With reference to FIG. 8, the integration circuit 118 includes the above described A/D converter 130 which receives a clock signal from the timing signal generator 120, and the output of the enveloped-detector 111 is given to an input A/D converter 130. The A/D converter 130 converts the output level of the enveloped-detector 111 into a digital data which is given to one input of an adder 131, and to the other input of the adder 131, an output of a latch circuit 132 which latches an output of the adder 131 in response to a timing signal (reset & hold signal) from the timing signal generator 120 is applied. Therefore, the digital integration circuit 118 is constructed by the adder 131 and the latch circuit 132.

An output of the digital integration circuit 118, that is, latch circuit 132 is read in response to the timing signal from the timing signal generator 120 to be input to the first holding circuit 119. The output of the first holding circuit 119 is given to the second holding circuit 121 in response to the timing signal. Thus, by sequentially holding the output of the digital integration circuit 118 in the first holding circuit 119 and the second holding circuit 121, the first holding circuit 119 and the second holding circuit 121 respectively hold the level of the output of the enveloped-detector 111 as integrated during different time periods. As easily understood, an integrated value data held in the second holding circuit 121 is older than an integrated value data held in the first holding circuit 119.

The integrated value data held in the first holding circuit 119 and the integrated value data held in the second holding circuit 121 are respectively input to the comparing circuit 122. As described above, when the integrated value data held in the first holding circuit 119 is larger than the integrated value data held in the second holding circuit 121, the high level signal is output from the comparing circuit 122. In reverse, the low level signal is output from the comparing circuit 122 when the integrated value data held in the second holding circuit 121 is larger than the integrated value data held in the first holding circuit 119.

An output of the comparing circuit 122 is given to a clock input of a D flip-flop 123 constituting the judge circuit. To a data input of the D flip-flop 123, an inverted output $\overline{Q}$ thereof is applied and a non-inverted output Q thereof is given to the control circuit 124.

The control circuit 124 includes an AND gate 133 having one input which receives the output of the judge circuit, that is, D flip-flop 123. The output Q of the D flip-flop 123 is given to one input of an OR gate 134. A gate signal from the timing signal generator 120 is given to the other input of the AND gate 133, and the same is inverted and given to the other input of the OR gate 134. An output of the AND gate 133 and an output of the OR gate 134 are applied to a gate of an N-channel FET 135 and a gate of a P-channel FET 136, respectively. These N-channel FET 135 and P-channel FET 136 constitute a charge pump. More specifically, a capacitor 138 is connected between a connection point of the N-channel FET 135 and the P-channel FET 136 and a reference potential (the ground potential in this embodiment shown) through a switch 137. A switching signal from the RS flip-flop 107 is applied to the switch 137 which stops the charge from the charge pump to the capacitor 138 when the switching signal is the low level.

Figure 9:
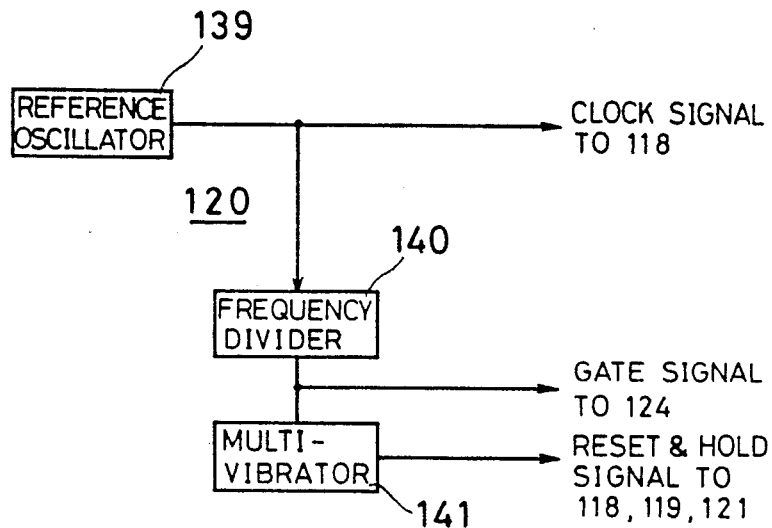
FIG. 9 is a block diagram showing a timing signal generator of FIG. 5 embodiment.

As shown in FIG. 9, the timing signal generator 120 includes a reference oscillator 139 an oscillation output of which is given to the integration circuit 118 as a clock signal and to a frequency divider 140. The frequency divider 140 frequency-divides an oscillation signal of the reference oscillator 139 at a predetermined division ratio, and a frequency-divided output is given to a monostable multivibrator 141. A pulse signal having a predetermined width is output from the monostable multivibrator 141 in response to a rising edge of the frequency-divided output of the frequency divider 140. The output of the frequency divider 140 is given to the AND gate 133 and the OR gate 134 included in the control circuit 124 (FIG. 8) as the gate signals. In addition, an output of the multivibrator 141 is given to the integration circuit 118, the first holding circuit 119 and the second holding circuit 121 as reset & hold signals therefor. That is, the output of the monostable multivibrator 141 is applied to the integration circuit 118 as a reset signal therefor, and to the holding circuits 119 and 121 as holding signals therefor.

In the spread spectrum signal demodulation circuit as shown in FIG. 5, when the switch 116 is operated, the RS flip-flop 107 is reset and the output Q becomes the low level. Therefore, the signal from the oscillator 105 is selectively applied to the PN code generator 108 through the selector 106 so that the oscillation signal from the oscillator 105 is used in the PN code generator 108 as a clock signal. In this state, the 4-nary counter 125 of the PN code generator 108 is enabled, and therefore, the demodulation PN code which is the repetition of the data of 4 bits in total of x, y and z plus one indefinite bit as shown in FIG. 7 (D) is outputted from the PN code generator 108.

The demodulation PN code from the PN code generator 108 is multiplied with the spread spectrum signal from the input terminal 101 in the multiplier 109. If the phase of the demodulation PN code is not coincident with the phase of the modulation PN code included in the spread spectrum signal, it is impossible to demodulate the spread spectrum signal, and therefore, no output is obtained from the bandpass filter 110.

As previously described, the phase of the demodulation PN code is gradually changed so that the phase of the demodulation PN code from the PN code generator 108 become coincident with the phase of the modulation PN code at every 12 bits. Therefore, an output having a predetermined level is obtained from the multiplier 109, that is, the bandpass filter 110. In response thereto, the output from the level detector 115 becomes the high level, and the RS flip-flop 107 is set so that the output Q the RS flip-flop 107 becomes the high level. Therefore, the selector 106 selects an oscillation signal from the VCO 102 to apply the PN code generator 108 instead of the output of the oscillator 105. At the same time, since an inhibit signal is applied to the 4-nary counter 125 (FIG. 6) included in the PN code generator 108 from the RS flip-flop 107, the PN code generator 108 is brought in a state where the PN code (FIG. 4 (B)) which is the repetition of the data of 3 bits is output as similar to the PN code generator 8 shown in FIG. 3 and FIG. 4.

Then, the input spread spectrum signal is multiplied by the demodulation PN code of 3 bits output from the PN code generator 108 in the multiplier 109, and resultingly, a carrier component of the spread spectrum signal (when the carrier component is modulated, a modulated carrier component) is output from the multiplier 109.

The carrier component is detected by the enveloped-detector 111 and input to the integration circuit 118.

The output of the enveloped-detector 111 is converted into the digital data as shown in FIG. 10 (B) by the A/D converter 130 (FIG. 8) in response to the clock signal from the timing signal generator 120 as shown in FIG. 10 (A). Assuming that the digital data output from the A/D converter 130 are $a_1, a_2, \ldots, a_n, a_{n+1}, a_{n+2}, \ldots$ as shown in FIG. 10 (B), the output of the adder 130 becomes as $b_1, b_2(=a_1+b_1), \ldots, b_n(=a_{n-1}+b_{n-1}), \ldots$ as shown in FIG. 10 (D). In other word, the output of the adder 132 becomes the digital data of the value obtained by accumulating the output of the A/D converter 130 and the output of the latch circuit 132. Thus, in the integration circuit 118, the output of the detector 111 can be approximately integrated for a predetermined time period. The integartion circuit 118 is reset in response to a falling edge of the reset & hold signal from the timing signal generator 120.

In addition, the output of the latch circuit 131 is held in the first holding circuit 119 in response to a rising edge of the reset & hold signal as shown in FIG. 10 (C) from the timing signal generator 120. Then, when a next reset & hold signal is output from the timing signal generator 120, the digital data held in the first holding circuit 119 becomes t be held in the second holding circuit 121, and a new digital data from the digital integration circuit 118 is held in the first holding circuit 119. Therefore, the outputs of the first holding circuit 119 and the second holding circuit 121 become as shown in FIG. 10 (E) and FIG. 10 (F), respectively.

Thus, the comparing circuit 122 compares a present integrated value with an integrated value obtained just before. If the present integrated value is larger than the integrated value obtained just before, the high level signal is output from the comparing circuit 122. When the output of the comparing circuit 122 is the high level, it is indicated that the oscillation frequency of the VCO 102 is changed in a direction that the modulation PN code included in the input spread spectrum signal and the demodulation PN code from the PN code generator 108 become to be synchronized with each other. In addition, the output of the comparing circuit 122 is the low level, it is indicated that the oscillation frequency of the VCO 102 is changed in a direction that the demodulation PN code is not synchronized with the modulation PN code.

Figure 13:
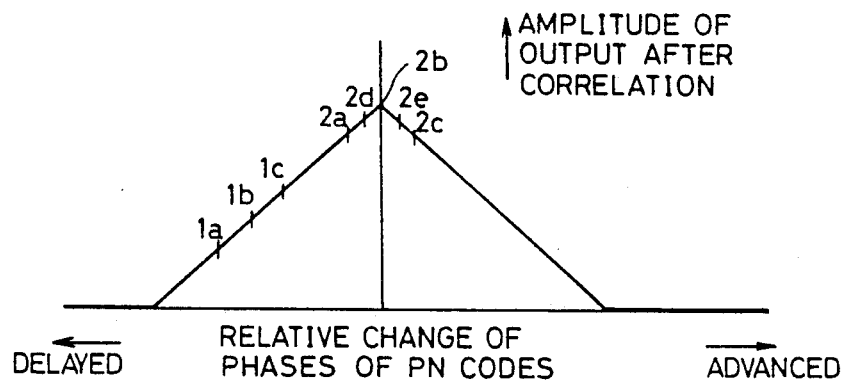
FIG. 13 is a graph showing a change of a signal amplitude with respect to a relative change of a phase of a demodulation PN code in FIG. 5 embodiment.

With reference to FIG. 13, assuming that the relative phase between the demodulation PN code and the modulation PN code exists at a point 1a and the high level signal is output from the comparing circuit 122, in the integration circuit 118, the output of the detector 111 between the point 1a and a point 1b is integrated during a former integration period, and the output of the detector 111 between the point 1b and a point 1c is integrated during a later integration period. Therefore, the integrated value between the points 1a and 1b is held in the second holding circuit 121 and the integrated value between the points 1b and 1c is held in the first holding circuit 119. In such a case, since the integrated value held in the first holding circuit 119 is larger than the integrated value held in the second holding circuit 121, the output of the comparing circuit 122 is the high level. Therefore, the output of the D flip-flop 123 constituting the judge circuit is not inverted. The output of the D flip-flop 123 is inverted at a timing when the output of the comparing circuit 122 becomes the low level If the output Q of the D flip-flop 123 is the high level, the output of the AND gate 133 (FIG. 8) becomes the high level when the gate signal from the frequency divider 140 (FIG. 9) included in the timing signal generator 120 is the high level. Therefore, the N-channel FET 135 is turned on, and the charge current is supplied to the capacitor 138 through the switch 137 being turned on by the output Q of the RS flip-flop 107. On the other hand, where the output Q of the D flip-flop 123 is the low level, the output of the OR gate 134 becomes the low level when the gate signal is the high level, and therefore, the P-channel FET 136 is turned on. Therefore, the charged charge of the capacitor 138 is discharged through the switch 137 and the P-channel FET 136. Accordingly, the terminal voltage of the capacitor 138 is changed and thus the oscillation frequency of the VCO 102 is changed. Therefore, the VCO 102 is controlled so that the phase of the demodulation PN code from the PN code generator 108 which utilizes the oscillation signal from the VCO 102 as a clock becomes to be synchronized with the phase of the modulation PN code included in the spread spectrum signal.

Figure 1:
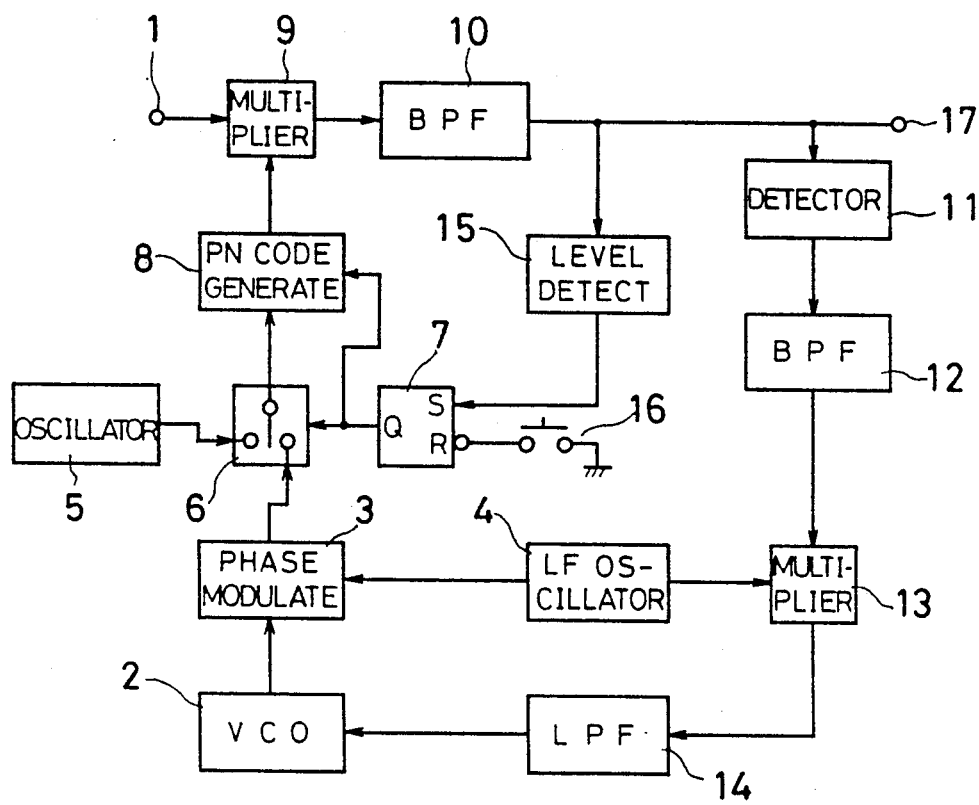
FIG. 1 is a block diagram showing a conventional tau-dither method.
Figure 2:
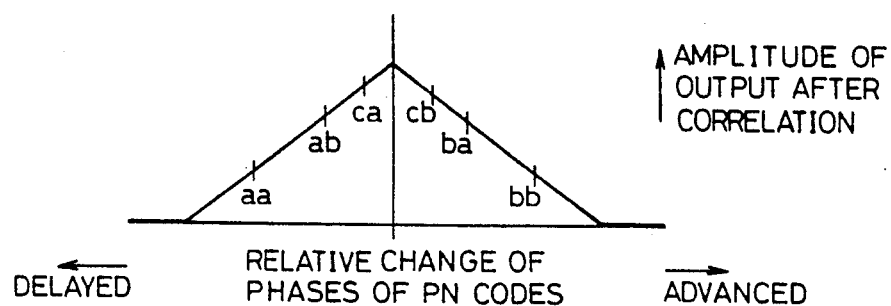
FIG. 2 is a graph showing a change of a signal amplitude with respect to a relative change of a phase of a demodulation PN code in a spread spectrum communication system.

In accordance with this embodiment shown, the present integrated value and the integrated value obtained just before are compared with each other in the comparing circuit 122, and based upon such a comparison result, the oscillation frequency of the VCO 102, that is, the phase of the demodulation PN code from the PN code generator 108 is controlled, and therefore, it is possible to omit a phase modulator which is necessary in FIG. 1 prior art. Therefore, a circuit configuration of a spread spectrum signal receiver can be made simple.

Where the timing signal 120 is constructed as shown in FIG. 9, if the integration periods T1 are between points 2a and 2b and between points 2b and 2c as shown in FIG. 13, respectively, the integrated value data being held in the first holding circuit 119 and the second holding circuit 121 become equal to each other, and therefore, a changing direction of the oscillation frequency of the VCO 102 might be indefinite.

Figure 11:
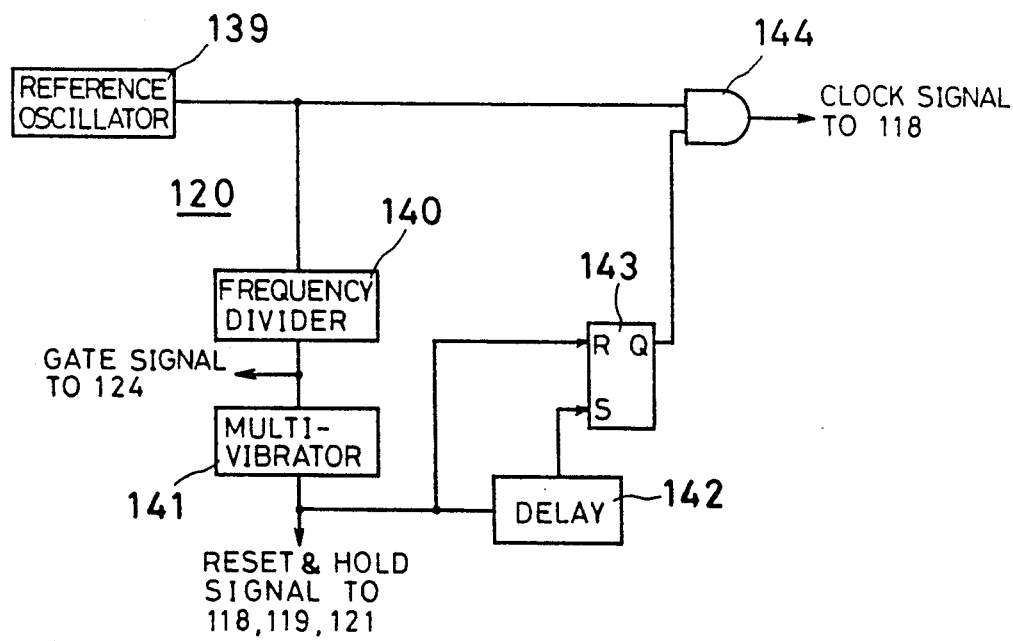
FIG. 11 is a block diagram showing another example of a timing signal generator of FIG. 5 embodiment.

In order to eliminate such a problem, a timing signal generator 120 as shown in FIG. 11 can be utilized. The timing signal generator 120 as shown in FIG. 11 is provided with a delay circuit 142 for delaying the output of the monostable multivibrator 141, that is, reset & hold signal (FIG. 12 (A)) by a predetermined time. An output of the delay circuit 142 shown in FIG. 12 (B) is given to a set input of an RS flip-flop 143, and the output of the monostable multivibrator 141 (reset & hold signal) is applied to a reset input of the RS flip-flop 143. An output Q of the RS flip-flop 143 as shown in FIG. 12 (C) is applied to one input of an AND gate 144 having the other input which receives a clock signal from the reference oscillator 139. An output of the AND gate 144 is given to the integration circuit 118 as a clock signal therefor. Since a clock signal is given to the integration circuit 118 from the timing signal generator 120 as shown in FIG. 12 (C) only a period during when the output Q of the RS flip-flop 143 is the high level, a period between points 2d and 2b and a period between points 2e and 2c shown in FIG. 13 become integration periods T2, respectively.

Therefore, in a case where the timing signal generator 120 is constructed as shown in FIG. 11, even if the integration periods are respectively defined between the points 2a and 2b and between the points 2b and 2c, the output of the comparing circuit 122 becomes the low level and thus the output Q of the D flip-flop 123 is inverted, and therefore, a changing direction of the frequency of the VCO 102 can be inverted. Therefore, the aforementioned problem occurred in a case where the timing signal generator 120 is constructed as shown in FIG. 9 can be eliminated.

In addition, in FIG. 8 embodiment, in order to define a control period of the VCO 102, the gate signal is output from the timing signal generator 120 and the AND gate 133 and the OR gate 134 are enabled or disabled by the gate signal. However, the output Q of the D flip-flop 123 may be directly supplied to FETs constituting the charge pump.

In FIG. 5 embodiment, the integrated value respectively integrated during continuous integration periods are compared with each other and the oscillation frequency of the VCO 102 is changed in a binary manner in accordance with the comparison result.

On the assumption that a frequency of the modulation PN code included in the input spread spectrum signal is fo and the frequencies of the demodulation PN code from the PN code generator 108, that is, a higher frequency and a lower frequency of the VCO 102 are $f_H$ and $f_L$, respectively, in the above described case, it is necessary to make respective frequency differences $f_H$-fo and fo-$f_L$ be small as possible, desirably equal to each other. For example, in a case where the frequency difference fo-$f_L$ is larger than the frequency difference $f_H$-fo, the degree of the phase change of the demodulation PN code at a timing when the oscillation signal having the oscillation frequency $f_L$ is output from VCO 102 becomes larger than the degree the phase change of the demodulation PN code at a timing when the oscillation signal having the oscillation frequency $f_H$ is output from VCO 102. Resultingly, the number of occurring times of the frequency $f_H$ becomes larger than the number occurring times of the frequency $f_L$, and therefore, a state where the phase of the demodulation PN code from the PN code generator 108 is delayed with respect to the phase of the modulation PN code occurs frequently. Therefore, an average phase of the demodulation PN code exists at a delayed side. In such a case, since the level of the signal through the bandpass filter 110 becomes small, the signal is easily affected by noise, and thus, an obstacle might occur in demodulating the data.

In order to eliminate such a problem, a self-running oscillation frequency of the VCO 102 may be made coincident with the frequency of the modulation PN code and the frequency $f_H$ and f&hd L may be set to satisfy the above described relationship. However, in practice, it is difficult to solve the above described problem due to fluctuations of elements such as a variable capacitance diode, and etc. constituting VCO 102 and a status of a communication system, for example, an influence of a reflection wave in a radio communication system. Therefore, FIG. 14 embodiment is proposed.

Figure 14:
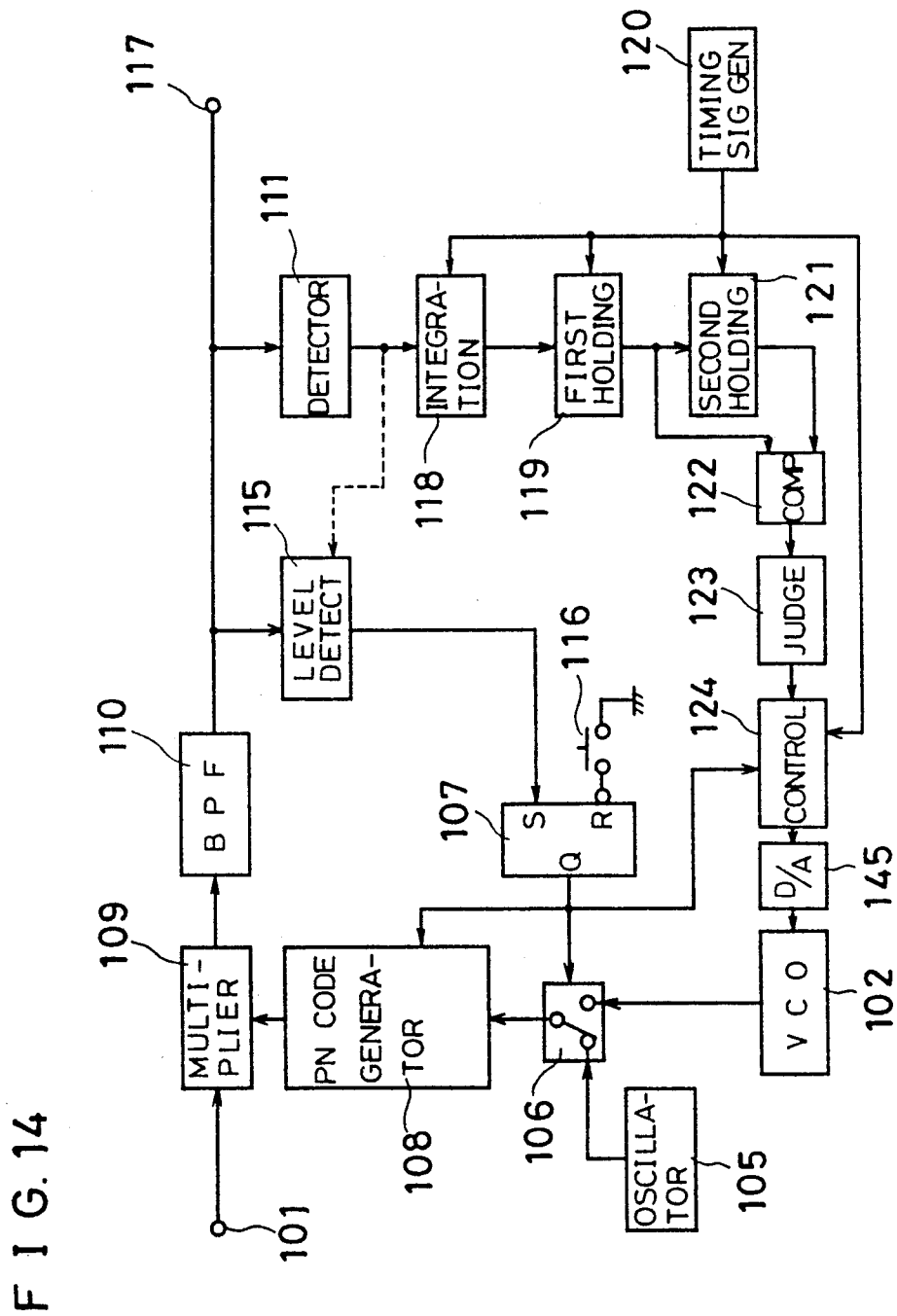
FIG. 14 is a block diagram showing another embodiment in accordance with the present invention.

FIG. 14 embodiment is similar to FIG. 5 embodiment except for the following points. More specifically, the control circuit 124 receiving the output of the judge circuit (D flip-flop) 123 is constructed as shown in FIG. 15, and the output of the control circuit 124 is applied to the VCO 102 as a control signal through a D/A converter 145.

With reference to FIG. 15, the reset & hold signal from the timing signal generator 120 as shown in FIG. 9 or FIG. 11 is applied to a first counter 146. The first counter 146 outputs a signal every timing when a predetermined number (in this embodiment shown, for example, "100") is counted, and the signal is applied to a reset input of a second counter 147. To an enable input of the second counter 147, the output Q of a judge circuit, that is, D flip-flop 123 is applied, and the reset & hold signal from the timing signal generator 120 is applied to a count input thereof. An output of the second counter 147 is given to a latch circuit 148 to which the signal from the first counter 146 is applied as a latch signal. An output of the latch circuit 148 is given to a comparator 149 to be compared with a reference value (in this embodiment shown, for example, "50". Signals individually indicating three states, that is, "a value of the latch circuit 148>the reference value", "the value of the latch circuit 148<the reference value" and "the value of the latch circuit 148=the reference value" are output from the comparator 149 in accordance with a comparison result therein. In a case of the third state, that is, "the value of the latch circuit 148=the reference value", a signal output from the comparator 149 is input to a set input of an RS flip-flop 150. To a reset input of the RS flip-flop 150, the non-inverted output Q from the RS flip-flop 107 as shown in FIG. 14 is applied.

The remaining signals from the comparator 149 are applied to a third counter 151 and a fourth counter 152 as up-down changing signals U/D thereof. The signal from the first counter 146 is applied to respective count inputs of the third counter 151 and the fourth counter 152. An output of the third counter 151 is a digital data designating the higher oscillation frequency $f_H$ of VCO 102, and an output of the fourth counter 152 is a digital data designating the lower oscillation frequency $f_L$ of the VCO 102, and these outputs are given to inputs A and B of a selector 153. The selector 153 is operated in response to the non-inverted output Q from the D flip-flop 123 and, when the output Q is the high level, the digital data from the third counter 151 is given to the D/A converter 145 (FIG. 14), and when the output Q is the low level, the digital data from the fourth counter 152 is applied to the D/A converter 145.

A non-inverted output Q of the above described RS flip-flop 150 is given to a reset input and a set input of two RS flip-flops 154 and 155, and a set input and reset input of the respective RS flip-flop 154 and 155 respectively receive the non-inverted output Q from the RS flip-flop 107 (FIG. 14). An output Q of the RS flip-flop 154 is applied to an enable input of each of the above described third counter 151 and the fourth counter 152. An output Q of the RS flip-flop 155 is given to a selection inputs of two selectors 156 and 157.

The output Q from the RS flip-flop 107 and the output Q of the RS flip-flop 150 are respectively given to delay circuits 158 and 159, and the delay circuit 158 has a delay time being a totalized time of a delay time due to the RS flip-flop 155 and a longer delay time out delay times due to the selectors 156 and 157. The delay circuit 159 has the same delay time as that of the delay circuit 158. Outputs of the delay circuits 158 and 159 are input two inputs of respective OR gates 160 and 161. An output of the OR gate 160 is given to a latch circuit 162 as a latch signal and to the third counter 151 as a preset signal. An output of the OR gate 161 is applied to a latch circuit 163 as a latch signal and to the fourth counter 152 as a preset signal. Therefore, the outputs of the latch circuits 162 and 163, that is, the outputs of the selectors 156 and 157 are respectively preset in the third counter 151 and the forth 152 in response to the preset signals.

The output of the third counter 151 is further applied to a subtractor 164 and the output of the fourth counter 152 is further applied to an adder 165. A data indicating a predetermined number (in this embodiment shown, for example, "30") is given to the subtractor 164 as a subtrahend. A data indicating a predetermined number (in this embodiment shown, for example, "30") is given to the adder 165 as an addend. Then, as both the inputs A and B of the selector 156, a data indicating a predetermined number (in this embodiment shown, for example "200") and an output of the above described subtractor 164 are applied thereto, and as both the inputs A and B of the selector 157, a data indicating a predetermined number (in this embodiment shown, for example, "100") and an output of the above described added 165 are respectively applied thereto.

In the spread spectrum signal demodulation circuit as shown in FIG. 14, when the switch 116 is operated, the RS flip-flop 107 is reset and the output Q becomes the low level. Therefore, the signal from the oscillator 105 is selectively applied to the PN code generator 108 through the selector 106 so that the oscillation signal from the oscillator 105 is used in the PN code generator 108 as a clock signal. In this state, the 4-nary counter 125 of the PN code generator 108 is enabled, and therefore, the demodulation PN code which is the repetition of the data of 4 bits in total of x, y and z plus one indefinite bit as shown in FIG. 7 (D) is output from the PN code generator 108.

The demodulation PN code from the PN code generator 108 is multiplied with the spread spectrum signal from the input terminal 101 in the multiplier 109. If the phase of the demodulation PN code is not coincident with the phase of the modulation PN code included in the spread spectrum signal, it is impossible to demodulate the spread spectrum signal, and therefore, no output is obtained from the bandpass filter 110.

As previously described, the phase of the demodulation PN code is gradually changed so that the phase of the demodulation PN code from the PN code generator 108 become coincident with the phase of the modulation PN code at every 12 bits. Therefore, an output having a predetermined level is obtained from the multiplier 109, that is, the bandpass filter 110. In response thereto, the output from the level detector 115 becomes the high level, and the RS flip-flop 107 is set so that the output Q the RS flip-flop 107 becomes the high level. Therefore, the selector 106 selects an oscillation signal from the VCO 102 to apply the PN code generator 108 instead of the output of the oscillator 105. At the same time, since an inhibit signal is applied to the 4-nary counter 125 (FIG. 6) included in the PN code generator 108 from the RS flip-flop 107, the PN code generator 108 is brought in a state where the PN code (FIG. 4 (B)) which is the repetition of the data of 3 bits is output as similar to the PN code generator 8 shown in FIG. 3 and FIG. 4.

In addition, when the RS flip-flop 107 is set as described above, since the RS flip-flop 154 (FIG. 15) is set by the output Q, the third counter 151 and the fourth counter 152 are respectively enabled, and since the RS flip-flop 155 is reset, each of the selectors 156 and 157 is brought in a state where the input A is to be selected.

In response to a rising edge of the output Q from the RS flip-flop 107 being delayed by the delay circuit 158, the latch circuits 162 and 163 latch the outputs of the selectors 156 and 157, respectively. At the same time, the preset signals are supplied to the third counter 151 and the fourth counter 152, and thus, "200" is preset in the third counter 151 and "100" is preset in the fourth counter 152.

If the output Q of the judge circuit, that is, D flip-flop 123 is the high level, the preset value "200" of the third counter 151 is given to the D/A converter 145 through the selector 153. Therefore, the data "200" is D/A-converted, and thus, a direct current voltage corresponding thereto is supplied to the VCO 102 as a control signal. Therefore, the VCO 102 outputs the oscillation signal having the higher frequency $f_H$ determined by the direct current voltage (control signal).

The input spread spectrum signal is multiplied by the demodulation PN code of 3 bits output from the PN code generator 108 in the multiplier 109, and resultingly, a carrier component of the spread spectrum signal (when the carrier component is modulated, a modulated carrier component) is output from the multiplier 109.

The carrier component is detected by the enveloped-detector 111 and input to the integration circuit 118. The output of the enveloped-detector 111 is converted into the digital data as shown in FIG. 10 (B) by the A/D converter 130 (FIG. 8) in response to the clock signal from the timing signal generator 120 as shown in FIG. 10 (A). Assuming that the digital data output from the A/D converter 130 are $a_1, a_2, \ldots, a_n, a_{n+1}, a_{n+2}, \ldots$ as shown in FIG. 10 (B), the output of the adder 130 becomes as $b_1, b_2(=a_1+b_1), \ldots, b_n(=a_{n-1}+b_{n-1}), \ldots$ as shown in FIG. 10 (D). In other words, the output of the adder 132 becomes the digital data of the value obtained by accumulating the output of the A/D converter 130 and the output of the latch circuit 131. Thus, in the integration circuit 118, the output of the detector 111 can be approximately integrated for a predetermined time period.

In addition, the output of the latch circuit 131 is held in the first holding circuit 119 in response to a rising edge of the reset & hold signal as shown in FIG. 10 (C) from the timing signal generator 120. When a next reset & hold signal is output from the timing signal generator 120, the digital data held in the first holding circuit 119 becomes to be held in the second holding circuit 121, and a new digital data from the digital integration circuit 118 is held in the first holding circuit 119. Therefore, the outputs of the first holding circuit 119 and the second holding circuit 121 become as shown in FIG. 10 (E) and FIG. 10 (F), respectively.

Thus, the comparing circuit 122 compares a present integrated value with an integrated value obtained just before. If the present integrated value is larger than the integrated value obtained just before, the high level signal is output from the comparing circuit 122. When the output of the comparing circuit 122 is the high level, it is indicated that the oscillation frequency of the VCO 102 is changed in a direction that the modulation PN code included in the input spread spectrum signal and the demodulation PN code from the PN code generator 108 become to be synchronized with each other. In addition, the output of the comparing circuit 122 is the low level, it is indicated that the oscillation frequency of the VCO 102 is changed in a direction that the demodulation PN code is not synchronized with the modulation PN code.

With reference to FIG. 13, assuming that the relative phase between the demodulation PN code and the modulation PN code exists at a point $1a$ and the high level signal is output from the comparing circuit 122, in the integration circuit 118, the output of the detector 111 between the point $1a$ and a point $1b$ is integrated during a former integration period, and the output of the detector 111 between the point $1b$ and a point $1c$ is integrated during a later integration period. Therefore, the integrated value between the points $1a$ and $1b$ is held in the second holding circuit 121 and the integrated value between the points $1b$ and $1c$ is held in the first holding circuit 119. In such a case, since the integrated value held in the first holding circuit 119 is larger than the integrated value held in the second holding circuit 121, the output of the comparing circuit 122 is the high level.

Therefore, the output of the D flip-flop 123 constituting the judge circuit is not inverted. The output of the D flip-flop 123 is inverted at a timing when the output of the comparing circuit 122 becomes the low level.

When, the output of the D flip-flop 123 is the high level, the second counter 147 of the control circuit 124 counts the reset & hold signal from the timing signal generator 120 and the same is reset by the signal from the first counter 146. A counted value of the second counter 147 is latched by the latch circuit 148 in response to the signal of the first counter 146. A latched output of the latch circuit 148 is given to the comparator 149 to be compared with the above described reference value "50".

When a counted value of the second counter 147 is larger than the reference value, that is, the number of occurring times of the higher frequency $f_H$ is larger than the number of occurring times of the lower frequency $f_L$, an average phase of the demodulation PN code exists at a delayed side, and therefore, a signal of the high level is output from the comparator 149 to a signal line L, and therefore, the third counter 151 and the fourth counter 152 then are set in an up count mode. The third counter 151 and the fourth counter 152 respectively increment the counted value thereof in response to the signal from the first counter 146. Therefore, the digital data being output from the selector 153 is incremented, and resultingly, the oscillation frequency of the VCO 102 is gradually increased.

In other words, when the number of occurring times of the higher frequency $f_H$ is larger than the number of occurring times of the lower frequency $f_L$, the frequency difference "$f_H$-fo" between the frequency fo of the modulation PN code included in the received spread spectrum signal and the higher frequency $f_H$ becomes smaller than the frequency difference "fo-$f_L$" between the frequency fo of the modulation PN code and the lower frequency $f_L$, and therefore, by shifting the oscillation frequency of the VCO 102 so that the frequencies $f_H$ and $f_L$ increase to make the above described frequency differences be small.

In addition, when the counted value of the second counter 147 is smaller than the reference value, that is, the number of occurring times of the higher frequency $f_H$ smaller than the number of occurring times of the lower frequency $f_L$, since the average phase of the demodulation PN code exists at an advanced side, a signal of the low level is output from the comparator 149 to the signal line L. Therefore, the third counter 151 and the fourth counter 152 are set in a down count mode. The third counter 151 and the fourth counter 152 respectively decrement the counted values thereof in response to the signal from the first counter 146. Therefore, the digital data being output from the selector 153 is decremented, and thus, the oscillation frequency of the VCO 102 is gradually decreased.

In other words, when the number of occurring times of the higher frequency $f_H$ is smaller than the number of occurring times of the lower frequency $f_L$, the frequency difference "$f_H$-fo" between the frequency fo of the modulation PN code and the higher frequency $f_H$ becomes smaller than the frequency difference "fo-$f_L$" between the frequency fo of the modulation PN code and the lower frequency $f_L$, and therefore, by shifting the oscillation frequency of the VCO 102 so that the frequencies $f_H$ and $f_L$ decrease to make the above described frequency differences be small.

The counted value of the second counter 147 becomes equal to the reference value by such a control of the oscillation frequency of the VCO 102, the high level signal S1 is output from the comparator 149. Therefore, the RS flip-flop 150 is set and the RS flip-flop 154 is reset and the RS flip-flop 155 is set. As a result, the enable signals for the third and fourth counters 151 and 152 become the low level and thus the third and fourth counters 151 and 152 ar disabled. In addition, since the output Q of the RS flip-flop 155 being the high level is given to the selectors 156 and 157, each of the selectors 156 and 157 is brought in a state where the input B is to be selected.

On the other hand, when the output Q from the RS flip-flop 150 is delayed by the delay circuit 159 an input to the OR gates 160 and 161, the OR gates 160 and 161 output the high level. In response to rising edges of the respective outputs of OR gates 160 and 161, the outputs of the selectors 156 and 157, that is B inputs are latched in the latch circuits 162 and 163. The B input to the selector 156 is the output of the subtractor 164 and the B input to the selector 157 is the output of the adder 165. Therefore, "a counted value just before $-30$" and "a counted value just before $+30$" are respectively preset in the third counter 151 and the fourth counter 152. Therefore, the VCO 102 oscillates at the oscillation frequency determined by "the counted value just before $-30$" or "the counted value just before $+30$" in response to the high level or the low level of the output of the judge circuit 123. In accordance with FIG. 14 embodiment, since the oscillation frequency of the VCO 102 is controlled so that the frequency difference between the frequency of the demodulation PN code from the PN code generator 108 and the frequency of the modulation PN code included in the spread spectrum signal is made small as possible, the level of the correlation signal in demodulating the spread spectrum signal can be made sufficiently large and thus the data can be surely demodulated with no influence of a noise.

In addition, in FIG. 15 embodiment, the control circuit 124 of FIG. 14 embodiment is constructed by discrete circuit components. However, the control circuit 124 may be constructed by a microcomputer. In such a case, the microcomputer (not shown) is operated in accordance with a flow chart as shown in FIG. 16.

Figure 16:
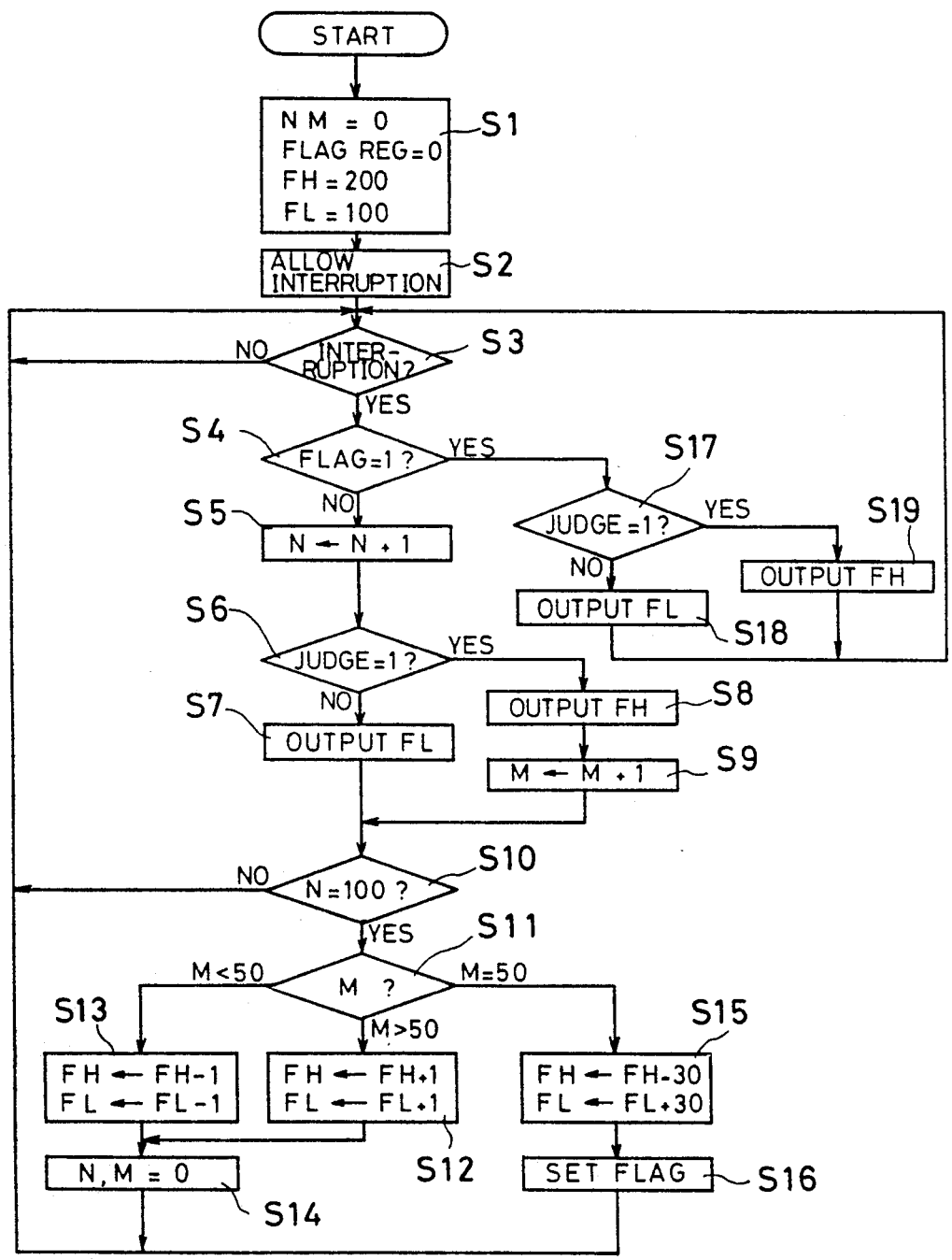
FIG. 16 is a flow chart showing an operation of a case where a control circuit is constructed by a microprocessor or microcomputer.

More specifically, when the switch 116 is operated, a routine shown in FIG. 16 is started, and in the first step S1, flag registers and counters N and M (all not shown) are set as "0" and a data FH corresponding to the higher frequency $f_H$ is set as "200" and a data FL corresponding to the lower frequency $f_L$ is set as "100". Thereafter, in the step S2, the microcomputer (not shown) allows an interruption.

An interruption occurs in step S3, the microcomputer determines whether or not the flag is "1" in the next step S4. Since the flag is set as "0" in step S1, "NO" is determined in step S4. Therefore, the microcomputer increments the counted value of the counter N in the succeeding step S5, and in step S6, determines whether or not the output of the judge circuit, that is, D flip-flop 123 is the high level. If the output of the D flip-flop 123 is the low level, the data FL is output to the D/A converter 145 in step S7. If the high level, the data FH is output to the D/A converter 145, and in the step S9, the counter M is incremented.

Next, in step S10, it is determined whether or not the counted value of the counter N is equal to "100". If "NO", the process returns to step S3, and if "YES", in step S11, a relationship between the counted value of the counter M and the reference value "50" is determined.

When the counted value of the counter M is larger than the reference value (M>50), after the increment of the data FH and FL in step S12, the counters N and M are reset in step S14, and the process returns to the afore mentioned step S3.

When the counted value of the counter M is smaller than the reference value (M<50), after the decrement of the data FH and FL in step S13, the counters N and M are reset in step S14, and the process returns to the step S3.

When the counted value of the counter M is equal to the reference value (M=50), in step S15, the predetermined number "30" is subtracted from the data FH and the predetermined number "30" is added to the data FL. Thereafter, the flag is set in step S16, and the process returns to step S3.

After the flag is set as "1" in step S16, "YES" is determined in step S4, the process jumps to step S17. In step S17, it is determined whether or not the output of the D flip-flop 123 is "1". If the output of D flip-flop 123 is "0", in step S18, the data FL is output to the D/A converter 145. If the output of the D flip-flop 123 is "1", in step S19, the data FH is output to the D/A converter 145.

In addition, specific numeral values "200", "100", "50"and "30" in the above describe embodiment are only examples, such numeral values may be changed arbitrarily.

Figure 17:
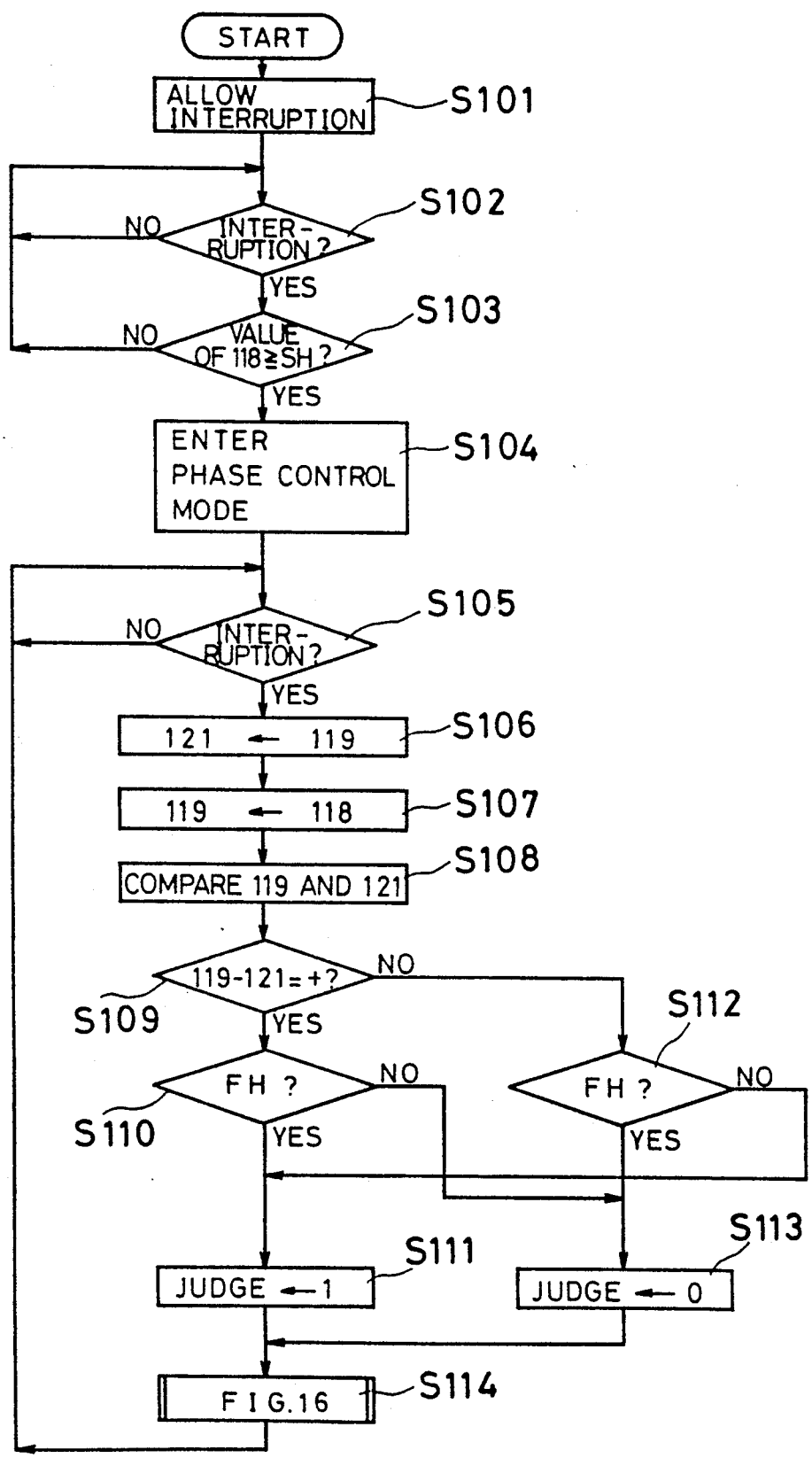
FIG. 17 is a flow chart showing a modification of FIG. 16 embodiment.

In addition, in FIG. 16 embodiment, only the control circuit 124 (FIG. 14) is constructed by the microcomputer. However, the comparing circuit 122, judge circuit 123 and the control circuit 124 shown in FIG. 14 can be constructed by a single microcomputer. In such a case, the microcomputer (not shown) executes a routine shown by the flow chart in FIG. 17.

More specifically, in the first step S101 after the operation of the switch 116, the microcomputer allows an interruption. When an interruption is detected in the step 102, the microcomputer determines whether or not the integrated value of the integration circuit 118 is larger than a predetermined threshold value SH in step S103. When the integrated value is larger than the threshold value SH, in step S104, the process enters to a phase control mode for the demodulation PN code.

When an interruption is detected in step S105, the data of the first holding circuit 119 is transferred to the second holding circuit 121 in step S106, and in step S107, the output of the integration circuit 118 is held in the first holding circuit 119. Then in step S108, the data respectively held in the holding circuits 119 and 121 are compared with each other. In step S109, it is determined whether or not the data held in the first holding circuit 119 is larger than the data held in the second holding circuit 121. If "YES", in step S110, it is determined whether or not a previously output data was the data FH corresponding to the higher frequency. If the previously output data is the data FH, the judge output is set as "1" in step S111. If "NO" is determined in step S109, in step S112, it is determined whether or not a previously output data was the data FH corresponding to the higher frequency, and if the previous data is FH, the judge output is set as "1" in step S113. Then, after the execution of step S111 or S113, the process enters to the control routine previously shown in FIG. 16. However, a duplicate description will be omitted here.

In the control routine shown by the flow chart in FIG. 16, when the frequency of the modulation PN code exists in a frequency range of the VCO 102 which is controlled in a binary manner, no problem occurs. However, the frequency of the modulation PN code exists outside the frequency range of the VCO 102, a non-controlled state occurs. Generally, an oscillation frequency is changed in accordance with an ambient temperature of a VCO. Therefore, at a timing when a power is turned on, or the like, an oscillation frequency is largely different from an oscillation frequency when the same is normally operated, and resultingly, the frequency of the modulation PN code becomes not included in the changing range of the oscillation frequency of the VCO 102. In such a case, a non-controlled state occurs.

Figure 18:
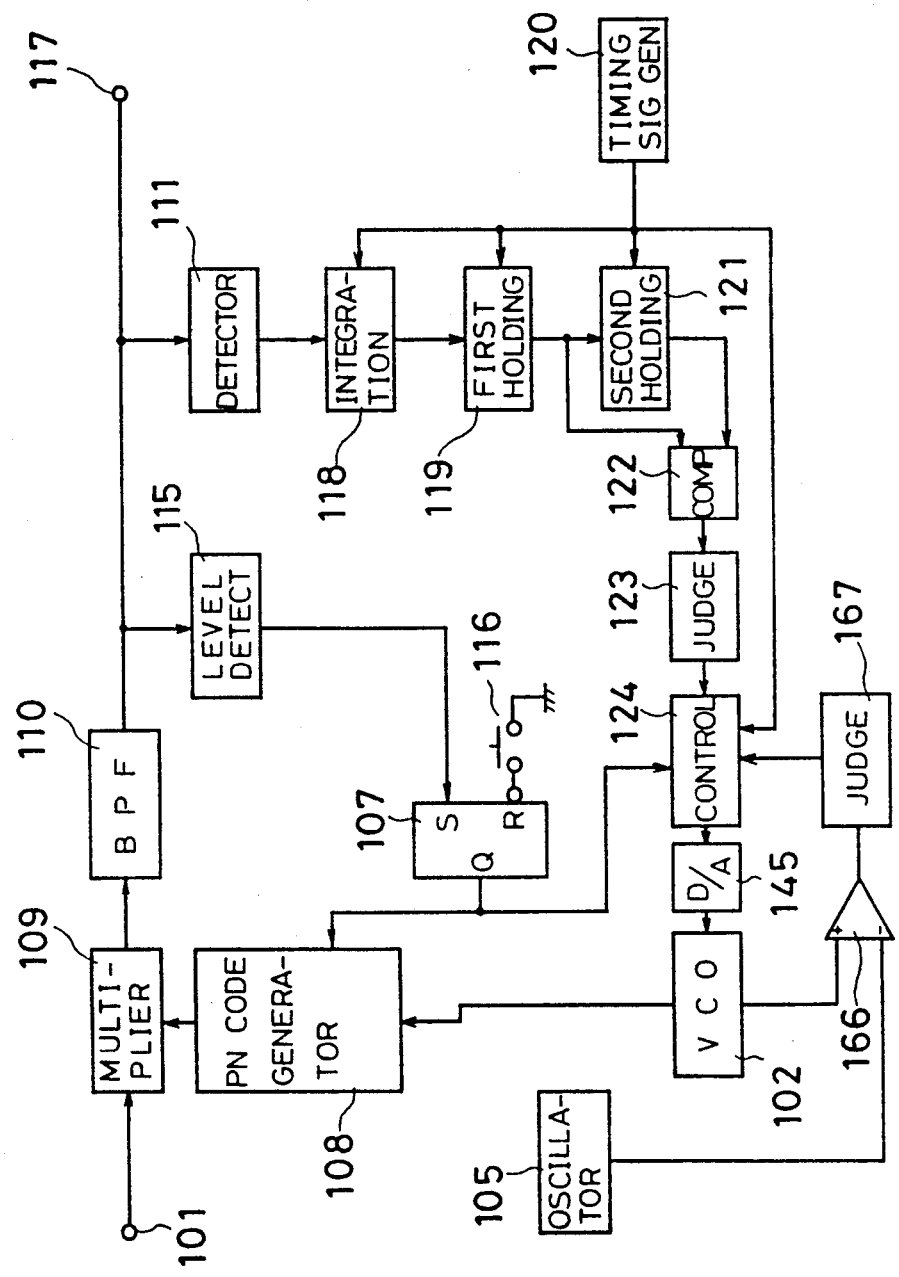
FIG. 18 is a block diagram showing another embodiment in accordance with the present invention.

FIG. 18 is a block diagram showing an embodiment suitable for solving such a problem. In this embodiment shown, the oscillation frequency of the oscillator 105 is set as the frequency of the modulation PN code. The frequency of the oscillator 105 and the frequency of the VCO 102 are compared with each other in a comparing circuit 166, and in accordance with a comparison result, a judge circuit 167 determines the frequency of the VCO 102 is to be higher or lower. When the frequency of the VCO 102 is to be higher, "1" is output from the judge circuit 166, and "0" is output when the frequency of the VCO 102 is to be lower. Then, in response to the output of the judge circuit 167, the oscillation frequency of the VCO 102 is controlled so that the frequency of the VCO 102 becomes equal to the frequency of the modulation PN code. In addition, the output of the VCO 102 or the output of the oscillator 105 is selected by the selector 106 to be applied to the PN code generator 108 in FIG. 14 embodiment; however, in this embodiment shown, the output of the VCO 102 is always given to the PN generator 108 as a clock signal therefor.

In FIG. 18 embodiment, the control circuit 124 can be constructed by a microcomputer. In this case, the microcomputer (not shown) operates in accordance with a flow chart shown in FIG. 19.

Figure 19:
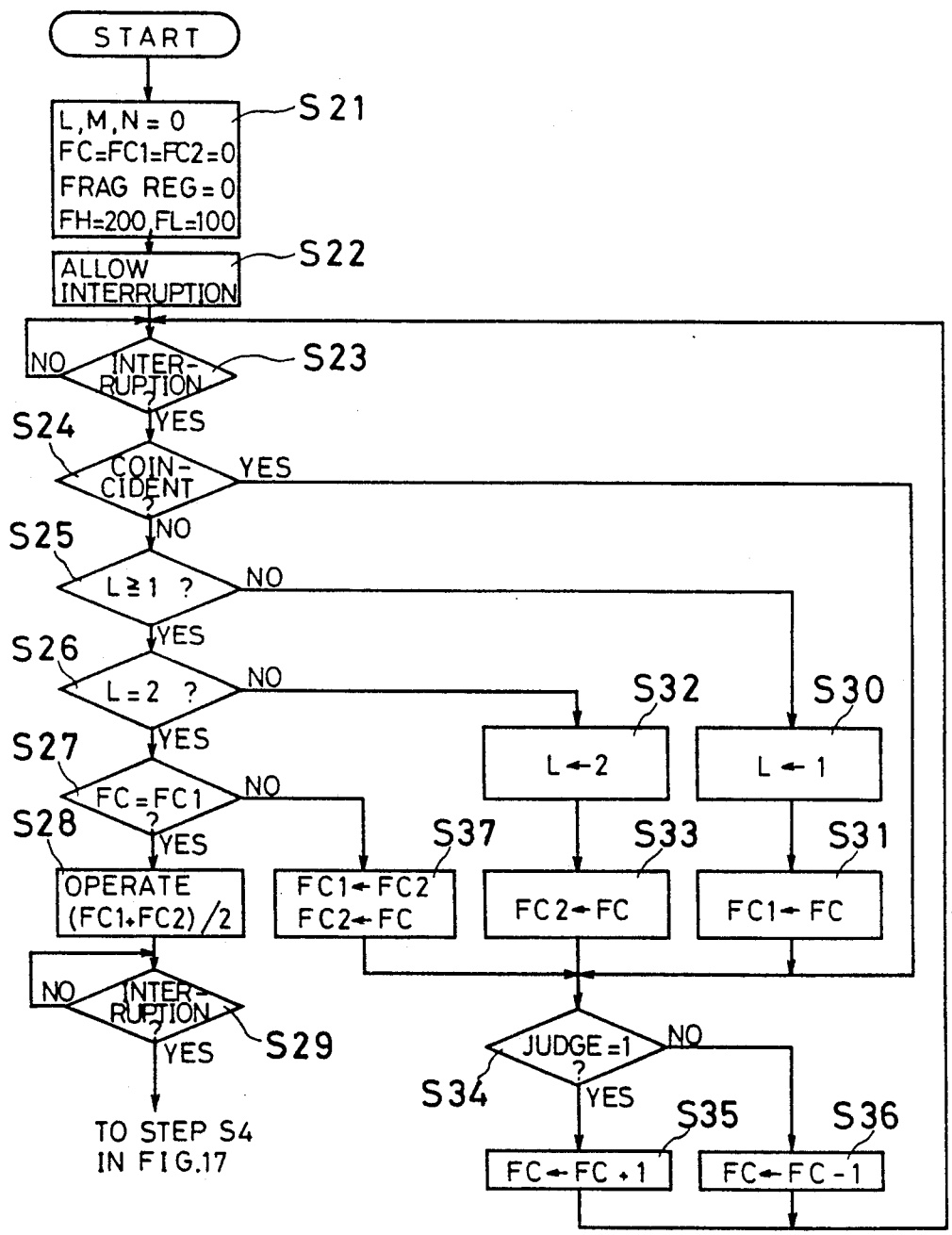
FIG. 19 is a flow chart showing an operation of a case where a control circuit shown in FIG. 18 is constructed by a microprocessor or microcomputer.

More specifically, when the switch 116 is operated, a routine shown in FIG. 19 is started, in the first step S21, counters FC, FC1 and FC, flag registers and counters L, M and N (all not shown) are set as "0", and a data FH corresponding to the higher frequency $f_H$ is set as "200" and a data FL corresponding to the lower frequency $f_L$ is set as "100". Thereafter, in the step S22, the microcomputer (not shown) allows an interruption.

When an interruption by an interruption pulse from the timing signal generator 120 occurs, the microcomputer reads the output of the judge circuit 166. In the next step S24, the microcomputer determines whether or not the output of the judge circuit 166 being presently output is coincident with the output of the judge circuit 166 in the previous interruption. If not coincident, in step S25, the microcomputer determines whether or not a value of the counter L is larger than a numeral value "1". When the value of the counter L is larger than the numeral "1" (L>1, in step S26, it is determined whether or not the value of the counter L is equal to a numeral value "2". When the value of the counter L is equal to the numeral value "2", in step S27, it is determined whether or not a value of the counter FC and the value FC1 are equal to each other. When "YES" is determined in step S27, in step S28, an average value (FC1+FC2)/2 of the values of the counters FC1 and FC2 is operated by the microcomputer and an operated result is given to the D/A converter 145. Therefore, the VCO 102 oscillates at a frequency determined by the average value of the counted values of the counters FC1 and FC2.

In addition, in step S29 succeeding to step S28, it is determined whether or not an interruption from the level detector 115 occurs, and such an interruption occurs, thereafter, a routine shown in FIG. 16 is executed.

"NO" is determined in the previous step S25, that is, L=0, after the increment of the counter L in step S30, in step S31, the counted value of the counter FC is set in the counter FC1. In addition, "NO" is determined in the previous step S26, that is, L=1, after the increment of the counter L in step S32, in step S33, the counted value of the counter FC is set in the counter FC2. Furthermore, "NO" is determined in the previous step S27, in step S37, the value of the counter FC2 is set in the counter FC1 and the value of the counter FC is set in the counter FC2.

After execution of the step S31, S33 or S37, the microcomputer determines whether or not the output of the judge circuit 166 is "1" in step S34. When "YES" is determined in step S34, that is, when the frequency of the VCO 102 is to be higher, the microcomputer increments the counter FC in the next step S35. Therefore, the value of the counter FC as incremented is given to the D/A converter 145 so that the VCO 102 oscillates at a frequency determined by that value. Thereafter, the process returns to the previous step S23. In addition, when "NO" is determined in step S34, that is, when the frequency of the VCO 102 is to be lower, the microcomputer decrements the counter FC in the next step S36. Therefore, the value of the counter FC as decremented is applied to the D/A converter 145 so that the VCO 102 oscillates at a frequency determined by that value. Thereafter, the process returned to the previous step S23.

Thus, in accordance with the embodiment shown in FIG. 18 and FIG. 19, it is determined that the frequency VCO 102 is to be higher or lower by the judge circuit 166, the frequency range of the VCO 102 can cover the frequency of the modulation PN code always, and therefore, a non-controlled state does not occur.

Figure 20:
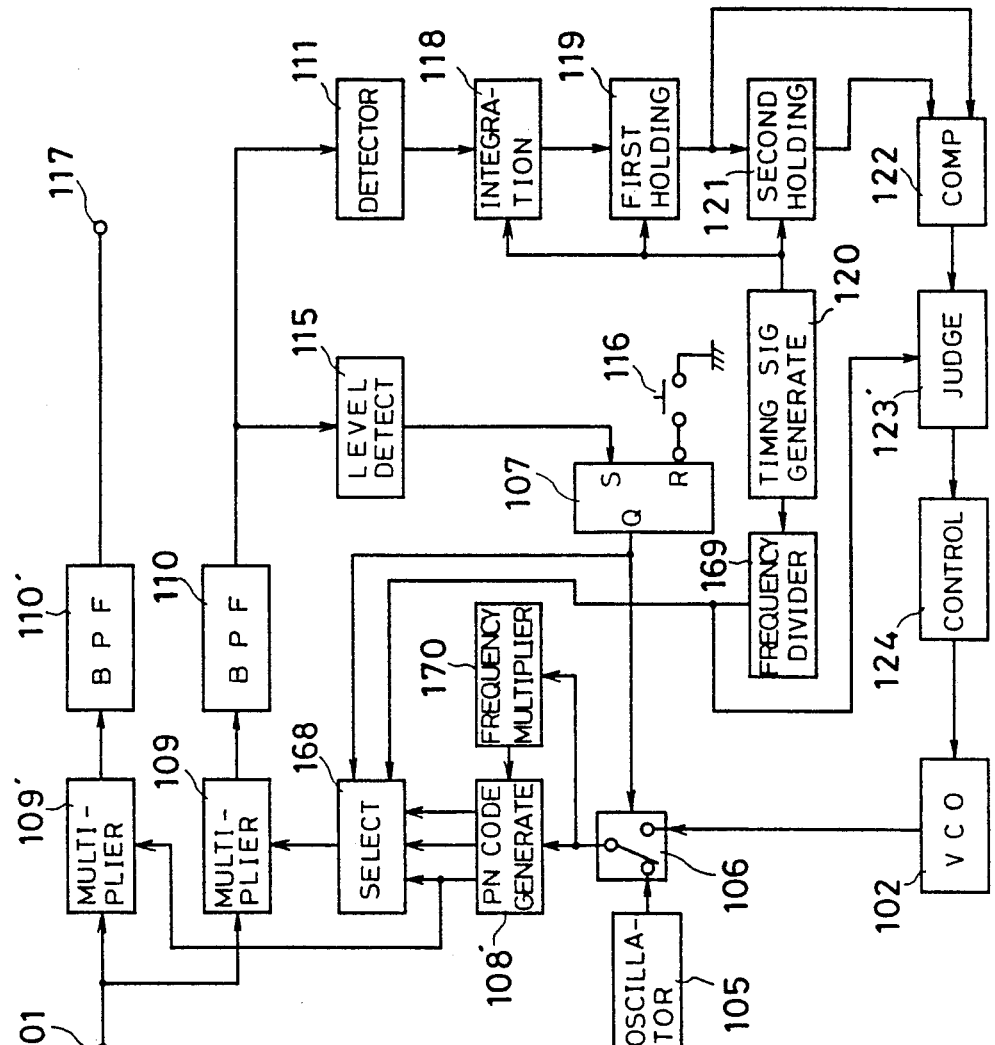
FIG. 20 is a block diagram showing the other embodiment in accordance with the present invention.

In addition, in order to increase the noise-resistant, an embodiment shown in FIG. 20 is also applicable. In this embodiment shown in FIG. 20, a spread spectrum signal is given to two multipliers 109 and 109' which are the same through the input terminal 101. Any one of a first, second and third synchronization PN codes which are generated by a PN code generating circuit 108' and selected by a selector is given to the multiplier 109, but one demodulation PN code from the PN code generating circuit 108' is given to the other multiplier 109 as a demodulation PN code. An output of the multiplier 109 is given to the bandpass filter 110 as similar to the aforementioned embodiments, and an output of the multiplier 109' is applied to a bandpass filter 110'. The two filters 110 and 110' have the same structure. An output of the bandpass filter 110 is applied to the envelope-detector 111', but an output of the bandpass filter 110' is output at the output terminal 117. In this embodiment shown, a signal path including the multiplier 109' and the bandpass filter 110' is utilized for demodulating the data included in the spread spectrum signal. On the other hand, the output of the envelope-detector 111 is, as similar to aforementioned embodiments, utilized for controlling the phase of the demodulation PN code, that is, the oscillation frequency of the VCO 102.

As shown in FIG. 21, the PN code generating circuit 108' includes the PN code generator 108, and two D flip-flops 171 and 172 which are connected to each other in a cascade fashion and receive the PN code generated by the PN code generator 108. The PN code output from the PN code generator 108 is given to the selector 168 as the second synchronization PN code, and the PN code output through the D flip-flop 171 is given to the selector 168 as the first synchronization PN code which is delayed in phase with respect to the second synchronization PN code, and the PN code output through the D flip-flops 171 and 172 is given to the selector 168 as the third synchronization PN code which is delayed in phase with respect to the first synchronization PN code. Then, the first synchronization PN code is given to the above described multiplier 109' as the demodulation PN code for demodulating the spread spectrum signal.

In addition, FIG. 20 embodiment is provided with a frequency-divider 169 which frequency-divides the reset & hold signal from the timing signal generator 120 at a division ratio of ½, and an output of the frequency-divider 169 is given to the judge circuit (D flip-flop) 123 and the selector 168. The demodulation circuit of this embodiment shown is further provided with a frequency-multiplier 170 which generates a signal having a frequency double the frequency of the oscillation signal of the oscillator 105 or the oscillation signal of the VCO 102 which is selected by the selector 106. An output of the frequency-multiplier 170 is given to the PN code generating circuit 108' as a clock signal for the D flip-flops 171 and 172. Therefore, as shown in FIG. 22, the second synchronization PN code from the PN code generator 108 (FIG. 21) is latched in D flip-flop 171 in response to the clock signal, thereby to generate the first synchronization PN code which is delayed to the second synchronization PN code by ½ chip, and the first synchronization PN code is latched by D flip-flop 172, the output of the D flip-flop 172 becomes the third synchronization PN code which is delayed to the first synchronization PN code by ½ chip.

In addition, the selector 168 selects the above described third synchronization PN code when the signal from the frequency divider 169 is the high level, or the second synchronization PN code when the signal from the frequency-divider 169 is the low level.

In the spread spectrum signal demodulation circuit as shown in FIG. 20, when the switch 116 is operated, the RS flip-flop 107 is reset and the output Q becomes the low level. Therefore, the signal from the oscillator 105 is selectively applied to the PN code generating circuit 108' through the selector 106 so that the oscillation signal from the oscillator 105 is used in the PN code generator 108 included in the PN code generating circuit 108' as a clock signal. In this state, the 4-nary counter 125 of the PN code generator 108 is enabled, and therefore, the demodulation PN code which is the repetition of the data of 4 bits in total of x, y and z plus one indefinite bit as shown in FIG. 7 (D) is output from the PN code generator 108. The PN code is output as the first, second and third synchronization PN codes through the D flip-flops 171 and 172 as shown in FIG. 21. In addition, since the output Q is the low level, the selector 168 selects the first synchronization PN code through the D flip-flop 171. Therefore, in this state, the first synchronization PN code which is generated by using the oscillation signal from the oscillator 105 is output from the selector 168.

The first synchronization PN code from the PN code generating circuit 108' is multiplied with the spread spectrum signal from the input terminal 101 in the multiplier 109, and the demodualtion PN code which is the same as the first synchronization PN code is multiplied with the input spread spectrum signal in the multiplier 109'. If the phase of the first synchronization PN code and thus the demodulation PN code is not coincident with the phase of the modulation PN code included in the spread spectrum signal, it is impossible to demodulate the spread spectrum signal, and therefore, no output is obtained from each of the the bandpass filters 110 and 110'.

As previously described, the phase of the PN code from the PN code generator 108 is gradually changed so that the phase of the synchronization PN code from the PN code generating circuit 108' become coincident with the phase of the modulation PN code at every 12 bits. Therefore, an output having a predetermined level is obtained from each of the multipliers 109 and 109', that is, the bandpass filters 110 and 110'. In response thereto, the output from the level detector 115 becomes the high level, and the RS flip-flop 107 is set so that the output Q the RS flip-flop 107 becomes the high level. Therefore, the selector 106 selects an oscillation signal from the VCO 102 to apply the PN code generating circuit 108' instead of the output of the oscillator 105. At the same time, since an inhibit signal is applied to the 4-nary counter 125 (FIG. 6) included in the PN code generator 108 of the PN code generating circuit 108' from the RS flip-flop 107, the PN code generator 108 is brought in a state where the PN code (FIG. 4 (B)) which is the repetition of the data of 3 bits is output as similar to the PN code generator 8 shown in FIG. 3 and FIG. 4.

Then, the input spread spectrum signal is multiplied by the first synchronization PN code and the demodulation PN code from the PN code generating circuit 108' in the multipliers 109 and 109', respectively, and resultingly, a carrier component of the spread spectrum signal (when the carrier component is modulated, a modulated carrier component) is output from each of the multipliers 109 and 109'.

The carrier component from the multiplier 109 is detected by the enveloped-detector 111 and input to the integration circuit 118. The carrier component from the multiplier 109' is withdrawn from the output terminal 117.

As shown in FIG. 23, the integration circuit 118 is constructed as similar the afore mentioned FIG. 5 embodiment, but the output of the comparing circuit 122 is inverted by an inverter 173 to be applied to one input of an exclusive OR gate 174 which constitutes a judge circuit 123'. To the other input of the exclusive OR gate 174, the output of the frequency-divider 169 is given, and an output of the exclusive OR gate 174 is input to the control circuit 124.

The output of the enveloped-detector 111 is converted into the digital data as shown in FIG. 10 (B) by the A/D converter 130 (FIG. 8) in response to the clock signal from the timing signal generator 120 as shown in FIG. 10 (A). Assuming that the digital data outputted from the A/D converter 130 are $a_1, a_2, \ldots, a_n, a_{n+1}, a_{n+2}, \ldots$ as shown in FIG. 10 (B), the output of the adder 130 becomes as $b_1, b_2(=a_1+b_1), \ldots, b_n(=a_{n-1}+b_{n-1}), \ldots$ as shown in FIG. 10 (D). In other words the output of the adder 131 becomes the digital data of the value obtained by accumulating the output of the A/D converter 130 and the output of the latch circuit 132. Thus, in the integration circuit 118, the output of the detector 111 can be approximately integrated for a predetermined time period. The integartion circuit 118 is reset in response to a falling edge of the reset & hold signal from the timing signal generator 120.

In addition, the output of the latch circuit 132 is held in the first holding circuit 119 in response to a rising edge of the reset & hold signal as shown in FIG. 10 (C) from the timing signal generator 120. When a next reset & hold signal is output from the timing signal generator 120, the digital data held in the first holding circuit 119 becomes to be held in the second holding circuit 121, and a new digital data from the digital integration circuit 118 is held in the first holding circuit 119.

In this embodiment shown, the reset & hold signal as shown in FIG. 24 (A) from the timing signal generator 120 is frequency-divided in the frequency-divider 169 at a division ratio of ½, and the output of the frequency-divider 169 as shown in FIG. 24 (B) is applied to the selector 168, and therefore, as shown in FIG. 24 (C), the third synchronization PN code and the second synchronization PN code are alternately given to the multiplier 109 from the selector 168. Therefore, a first signal based on a multiplied result of the third synchronization PN code by the input spread spectrum signal and a second signal based on a multiplied result of the second synchronization PN code by the input spread spectrum signal are alternately input to the integration circuit 118. Therefore, an output of the integration circuit 118 becomes as shown in FIG. 24 (D). The output of the integration circuit 118 is held in the first holding circuit 119 in response to the reset & hold signal from the timing signal generator 120, and the output of the first holding circuit 119 is held in the second holding circuit 121 in response to the same reset & hold signal, and therefore, as shown in FIG. 24 (E) and FIG. 24 (F), when integrated values Iv31, Iv32, . . . of the above described first signal are held in the first holding circuit 119, integrated values Iv21, Iv22 . . . of the above described second signal become to be held in the second holding circuit 121. In addition, an integrated value Iv0 which is initially held in the second holding circuit 121 is zero.

The integrated value being held in the first holding circuit 119 and the integrated value being held in the second holding circuit 121 ar compared with each other in the comparing circuit 122. When the former integrated value is larger than the latter integrated value, a signal of the high level is output from the comparing circuit 122; however, since the output of the frequency-divider 169 is the low level, the output of the exclusive OR gate 174 constituting the judge circuit 123' becomes the low level, and therefore, the P-channel FET 136 (FIG. 8) of the charge pump constituting the control circuit 124 is turned on. Therefore, the VCO 102 is controlled so that the oscillation frequency thereof is lowered, that is, the phase of the modulation PN code from the PN code generating circuit 108 is delayed.

In addition, a relationship of the output of the exclusive OR gate 174 with respect to the outputs of the frequency-divider 169 and the comparing circuit 122 is indicated in the following table.

| Output of the frequency-divider | Output of the comparing circuit | Output of EX-OR |
| --- | --- | --- |
| high level | high level | high level (advanced) |
| high level | low level | low level (delayed) |
| low level | high level | low level (delayed) |
| low level | low level | high level (advanced) |

In addition, in FIG. 20 embodiment, as similar to the previous embodiment, the judge circuit 123' may be constructed by utilizing a D flip-flop, and arbitrary control circuit 124 which is utilized in the previous embodiments may be adopted.

In accordance with FIG. 20 embodiment, since the signal demodulation path including the multiplier 109' and the bandpass filter 110' and the synchronization path for synchronizing the demodulation PN code with the modulation PN code are independently formed, it is possible to make the changing amount of the phase of the synchronization PN code, and therefore, the influence of noise can be reduced.

In any of the above described embodiments, as a first value and second value associated with an output of filter means at a first time and a second time later than the first time, the integrated values are utilized. However, instead of such integrated values, as shown in FIG. 25, the outputs of the bandpass filter 110 being sampled at different times may be compared with each other.

In FIG. 25 embodiment, the output of the bandpass filter (FIG. 5, etc.) is given to a sample hold circuit 175 which samples and holds the output of the bandpass filter in response to a clock signal from the timing signal generator 120. An output of the sample hold circuit 175 is given to a delay circuit 176 and one input of a comparing circuit 122'. An output of the delay circuit 176 is given to a holding circuit 177. A signal from the delay circuit 176 is output to the holding circuit 177 in response to the clock signal. Therefore, an output of the holding circuit 177 becomes a signal sampled at a time different from that of the sample hold circuit 175. Then, the output of the holding circuit 177 is given to the comparing circuit 122'. An output of the comparing circuit 122' is given to the judge circuit, that is, D flip-flop 123.

In FIG. 25 embodiment, since the values associated with the output of the bandpass filter obtained at different times are compared with each other, as similar to the aforementioned embodiments, there is no need to use a phase modulator required in a conventional tau-dither method.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A spread spectrum demodulation circuit, comprising:
   a variable frequency oscillator a frequency of which is changed in accordance with a control signal as applied;
   PN code generating means for generating a demodulation PN code by using an oscillation signal of said variable frequency oscillator as a clock thereof;

multiplying means for multiplying an input spread spectrum signal and said demodulation PN code;

filter means for receiving an output of said multiplying means;

first holding means for holding a first value associated with an output of said filter means at a first time;

second holding means for holding a second value associated with the output of said filter means at a second time later than said first time;

comparing means for comparing said first value and said second value being respectively held in said first holding means and said second holding means; and controlling means for outputting said control signal in accordance with an output of said comparing means to control said variable frequency oscillator so that said demodulation PN code from said PN code generating means can be synchronized with a modulation PN code included in said input spread spectrum signal.

2. A spread spectrum signal demodulation circuit in accordance with claim 1, wherein said first holding means and said second holding means hold said first value and said second value obtained through sampling the output of said filter means at different times, respectively.

3. A spread spectrum demodulation circuit in accordance with claim 1, further comprising integration means for integrating the output of said filter means, wherein said first holding means and said second holding means hold said first value and said second value output from said integration means, respectively.

4. A spread spectrum signal demodulation circuit in accordance with claim 1, wherein said control means includes frequency changing means for changing the oscillation frequency of said variable frequency oscillator in a binary manner.

5. A spread spectrum signal demodulation circuit in accordance with claim 4, wherein said frequency changing means includes means for changing said oscillation frequency so that a frequency of said demodulation PN code and said oscillation frequency changed by said frequency changing means are almost equal.

6. A spread spectrum demodulation circuit in accordance with claim 1, wherein said PN code generating means includes means for generating a PN code having a reference phase, and means for outputting two synchronization PN codes respectively having a time difference between said PN code having a reference phase, said PN code having a reference phase being utilized as said demodulation PN code are almost equal.

7. A spread spectrum signal demodulation circuit in accordance with claim 6, wherein said multiplying means includes first multiplying means for multiplying said input spread spectrum signal by said PN code having a reference phase, and second multiplying means for multiplying said input spread spectrum signal by one of said synchronization PN codes, an output of said first multiplying means being output from an output terminal through filter means, and an output of said second multiplying means being input to said filter means.

* * * * *